United States Patent
Miki et al.

(10) Patent No.: US 11,589,001 B2
(45) Date of Patent: Feb. 21, 2023

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Daisuke Miki, Tokyo (JP); Takahiro Sakamoto, Tokyo (JP); Katsunari Fukuya, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/288,762

(22) PCT Filed: Oct. 16, 2019

(86) PCT No.: PCT/JP2019/040620
§ 371 (c)(1),
(2) Date: Apr. 26, 2021

(87) PCT Pub. No.: WO2020/095639
PCT Pub. Date: May 14, 2020

(65) Prior Publication Data
US 2021/0400234 A1 Dec. 23, 2021

(30) Foreign Application Priority Data
Nov. 9, 2018 (JP) .............................. JP2018-211671

(51) Int. Cl.
*H04N 7/14* (2006.01)
*G06T 15/00* (2011.01)
(Continued)

(52) U.S. Cl.
CPC ............. *H04N 7/142* (2013.01); *G06T 15/00* (2013.01); *G06T 19/006* (2013.01); *H04N 5/272* (2013.01)

(58) Field of Classification Search
CPC combination set(s) only.
See application file for complete search history.

(56) References Cited

U.S. PATENT DOCUMENTS

| | | | |
|---|---|---|---|
| 2008/0012936 A1* | 1/2008 | White | H04N 7/144 348/E7.083 |
| 2013/0063539 A1* | 3/2013 | Sakuraba | H04N 5/262 348/14.02 |

(Continued)

FOREIGN PATENT DOCUMENTS

| | | |
|---|---|---|
| JP | H10-055257 A | 2/1998 |
| JP | 2009-065490 A | 3/2009 |

(Continued)

*Primary Examiner* — Phung-Hoang J Nguyen
(74) *Attorney, Agent, or Firm* — Paratus Law Group, PLLC

(57) ABSTRACT

There is provided an information processing apparatus including a display control section that controls a second display device present in a second space. The second display device displays a first captured image obtained by imaging at least one or more first users present in a first space. The display control section superimposes and displays a second user object on the first captured image in accordance with line-of-sight relevant information of each of the first users. The second user object corresponds to each of at least one or more second users present in the second space. This makes it possible to achieve more realistic communication.

13 Claims, 17 Drawing Sheets

(51) Int. Cl.
    *G06T 19/00*     (2011.01)
    *H04N 5/272*     (2006.01)

(56) References Cited

U.S. PATENT DOCUMENTS

2014/0132699 A1*  5/2014  Setton .................... H04N 7/147
                                                      348/14.03
2018/0343534 A1* 11/2018  Norris .................... H04N 5/232
2019/0043263 A1*  2/2019  Nakashima .......... G02B 27/017
2019/0222775 A1*  7/2019  Ahn ....................... H04N 7/141

FOREIGN PATENT DOCUMENTS

| JP | 2011-077913 A | 4/2011 |
| JP | 2015-002477 A | 1/2015 |

* cited by examiner

[FIG. 1]
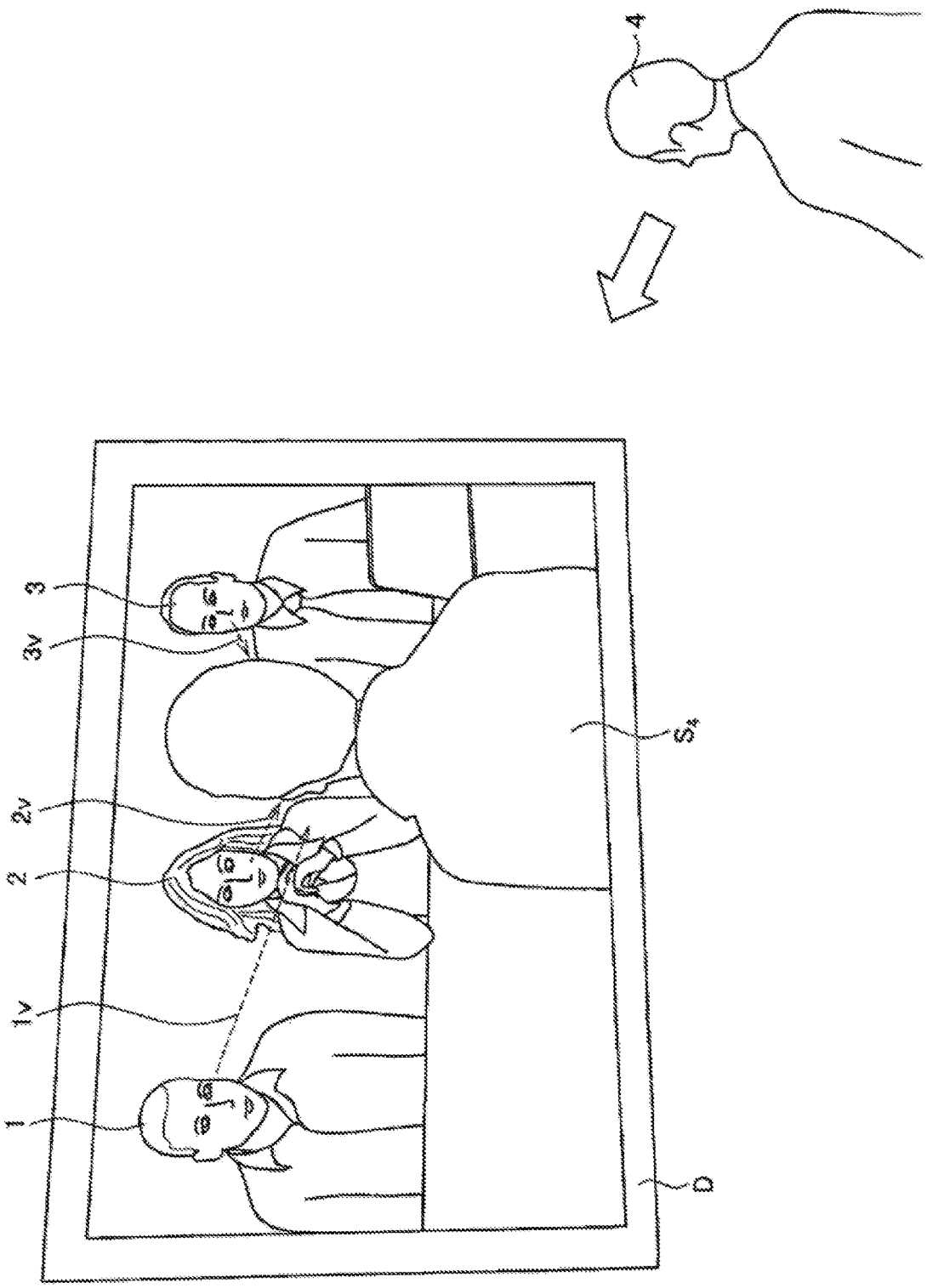

[FIG. 2]
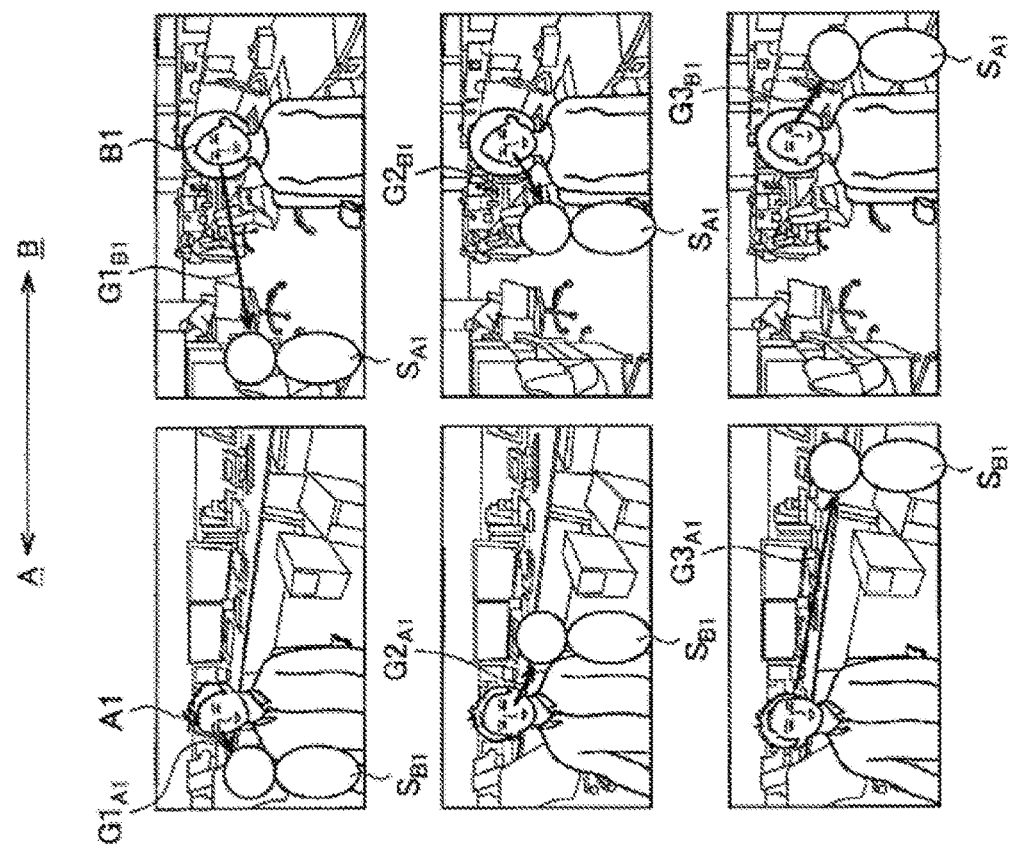
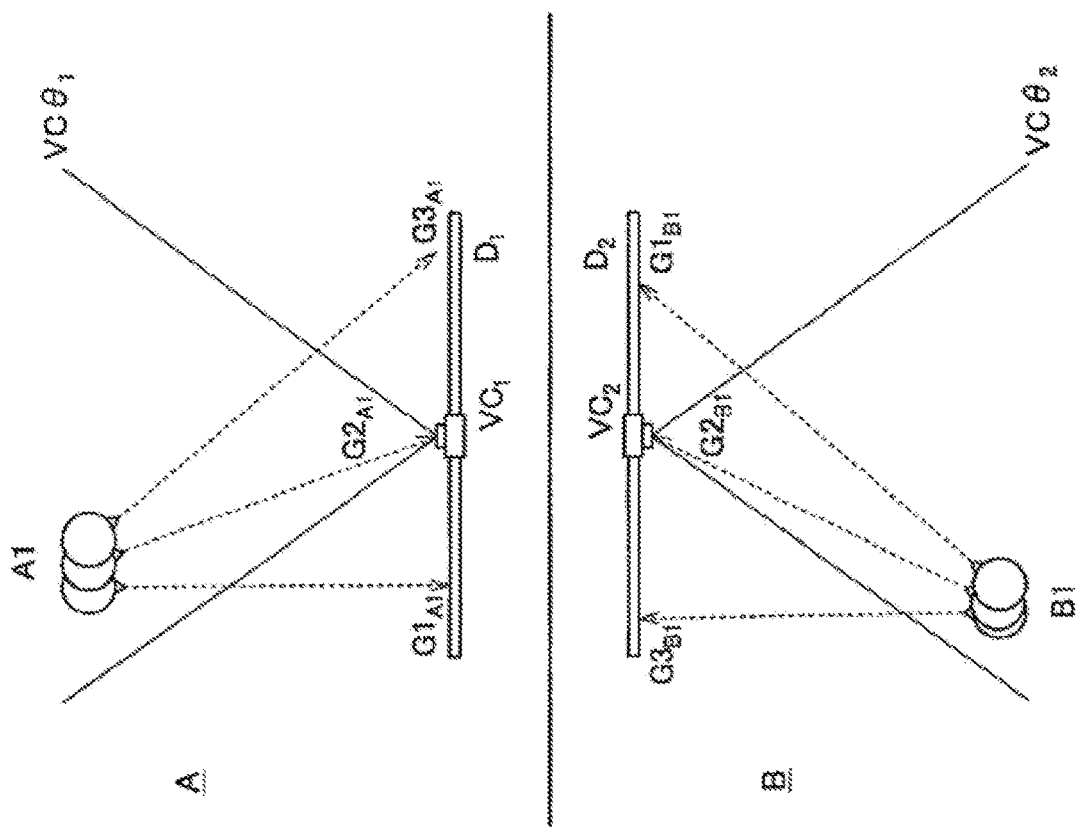

[FIG. 3]
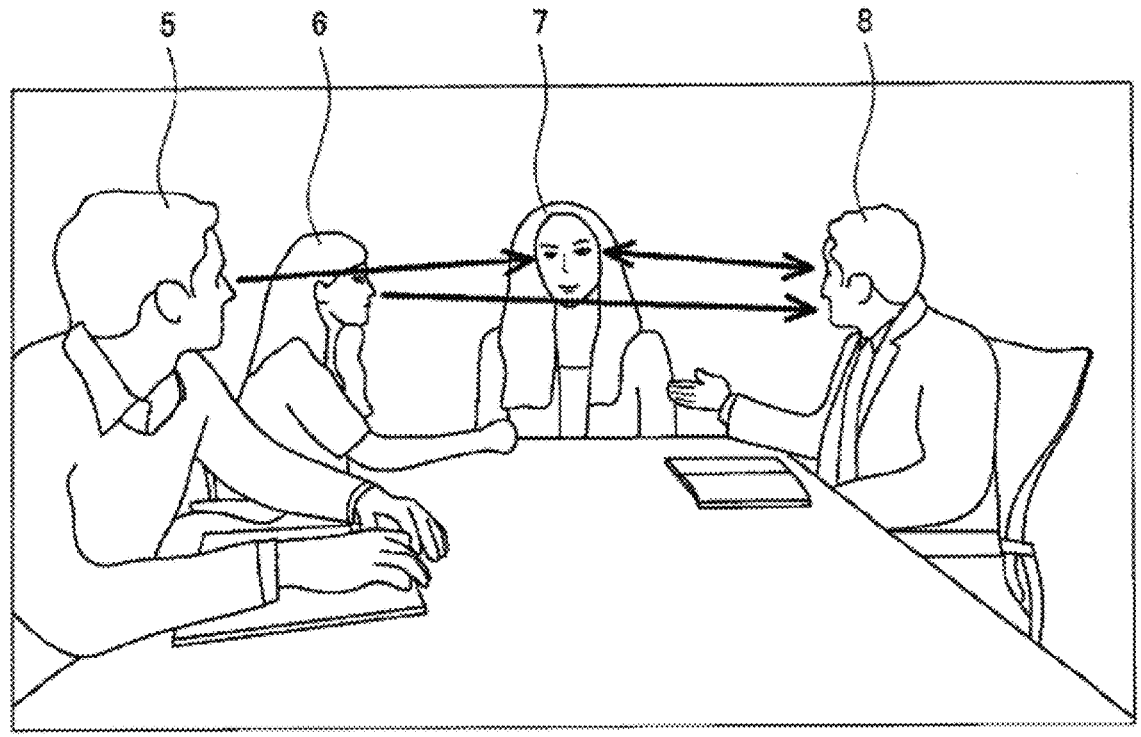
[FIG. 4]
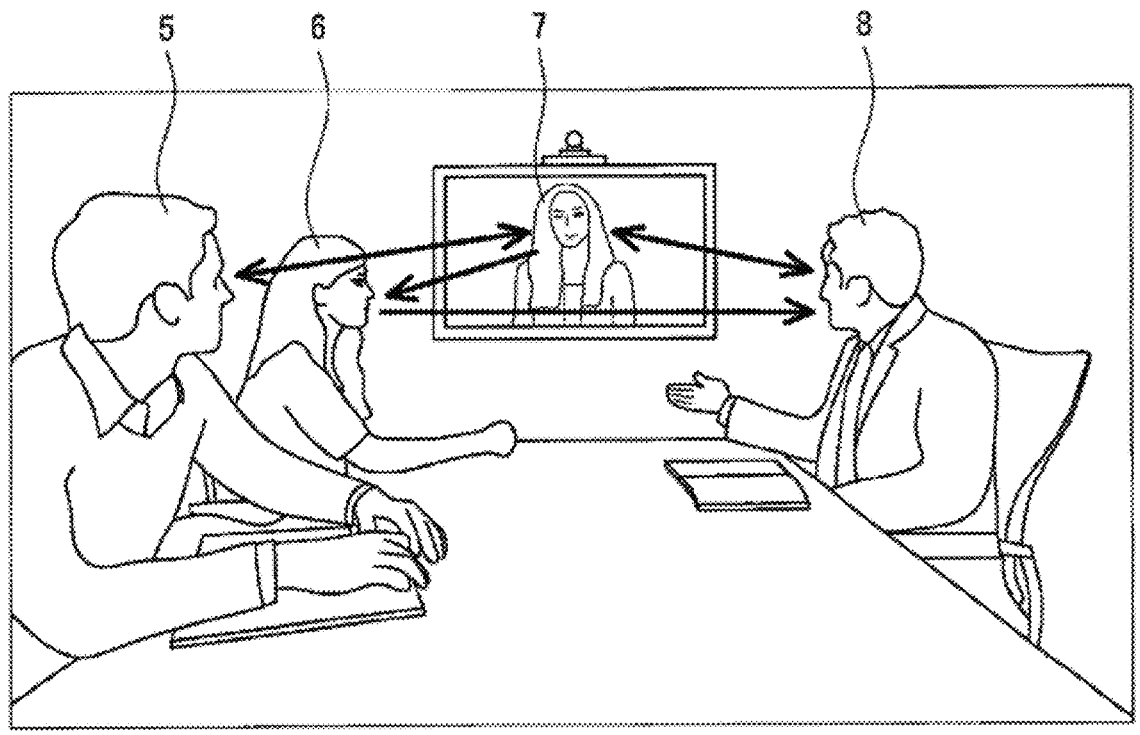

[FIG. 5]
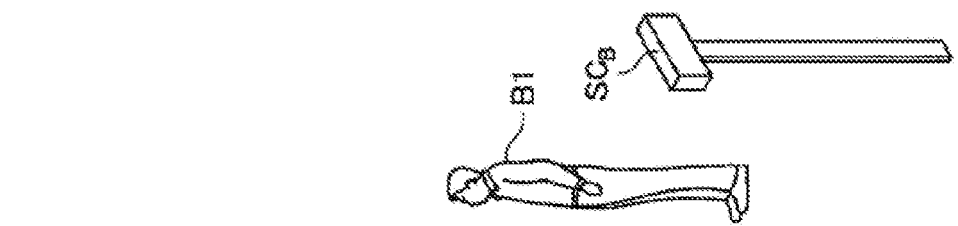
B:
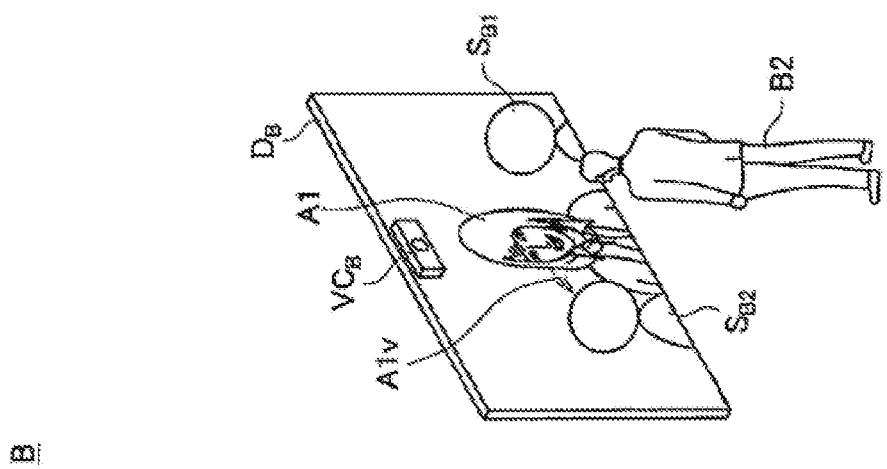
A:
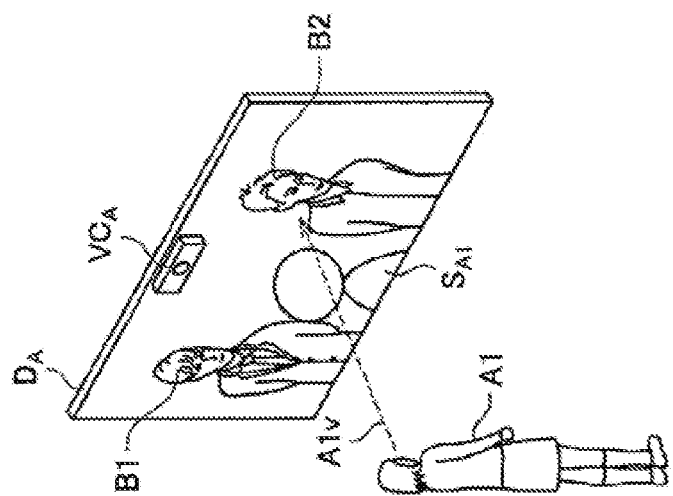
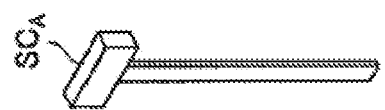

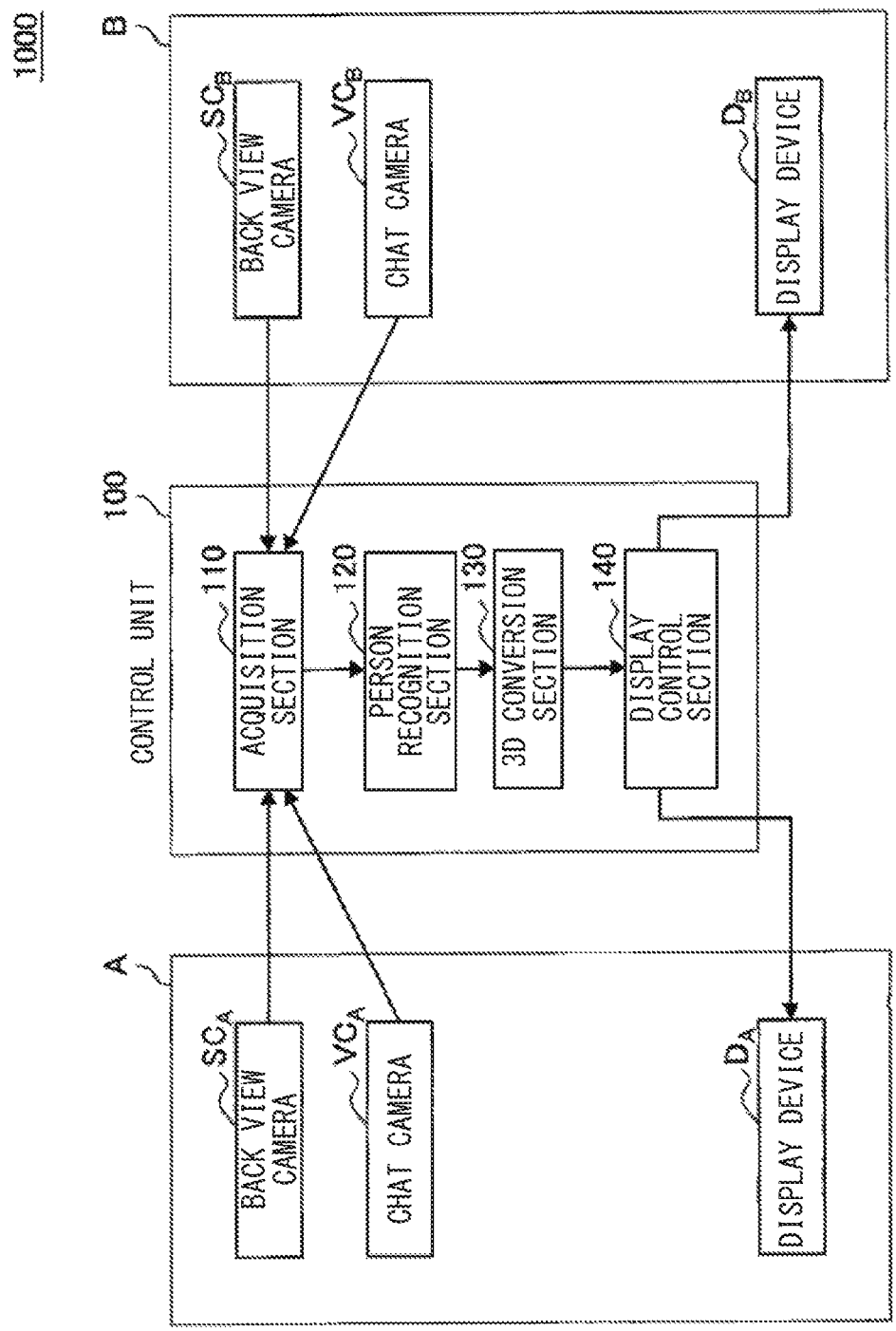
[FIG. 6]

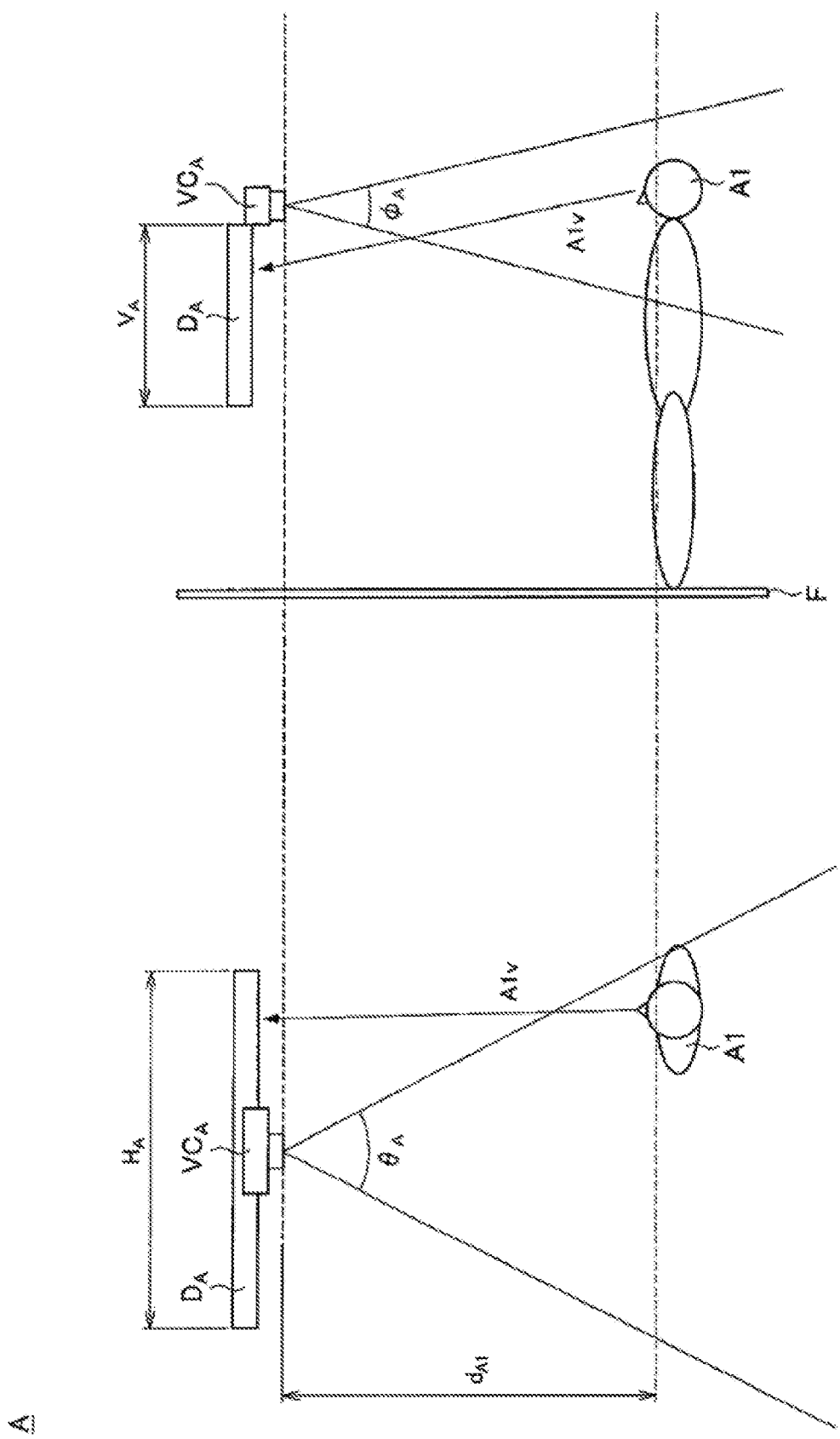

[FIG. 8]
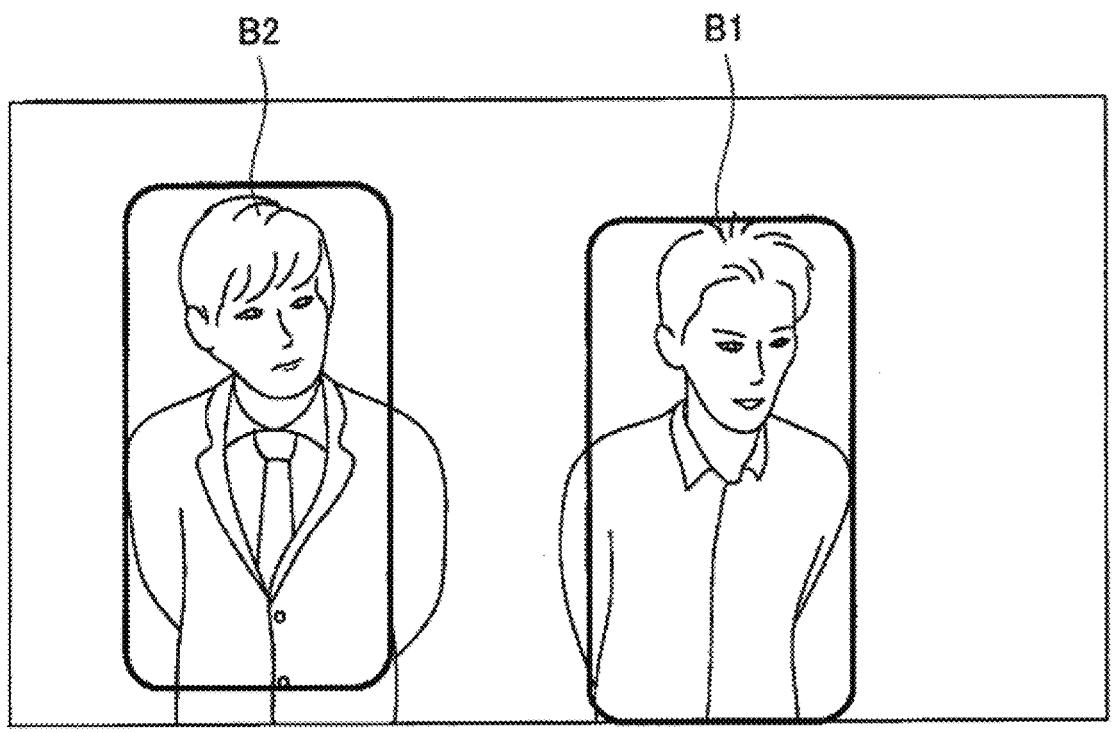

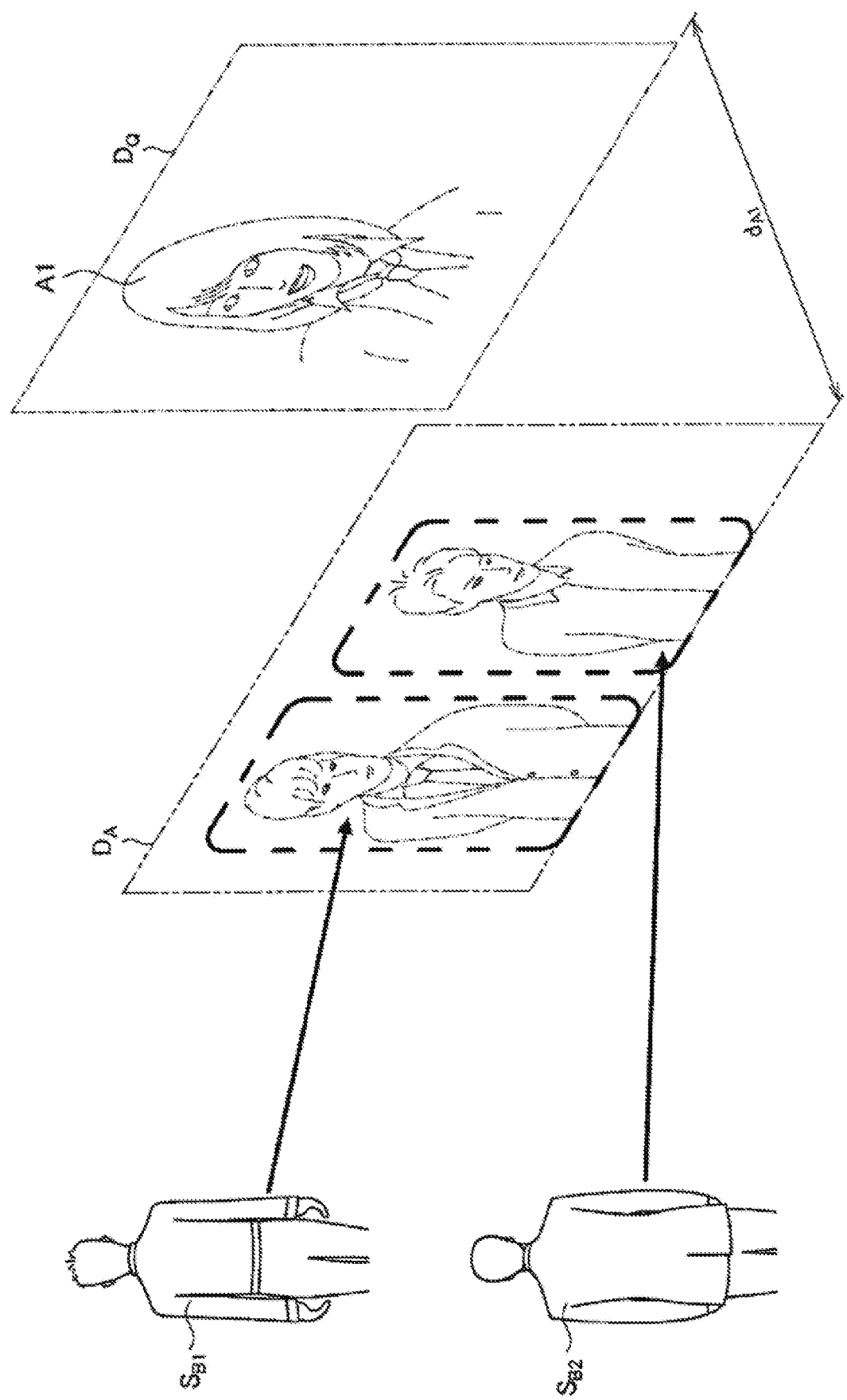
[FIG. 9]

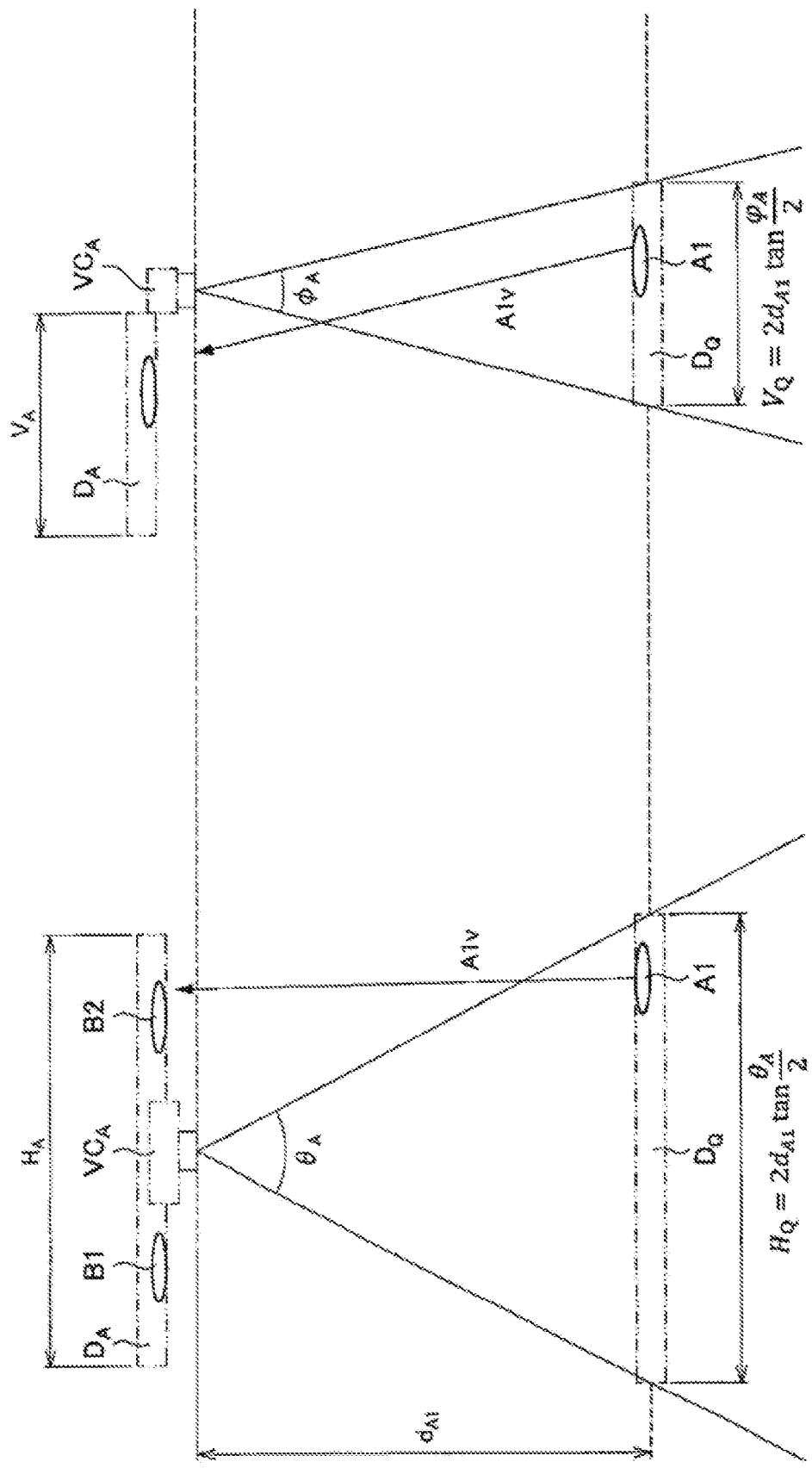
[FIG. 10]

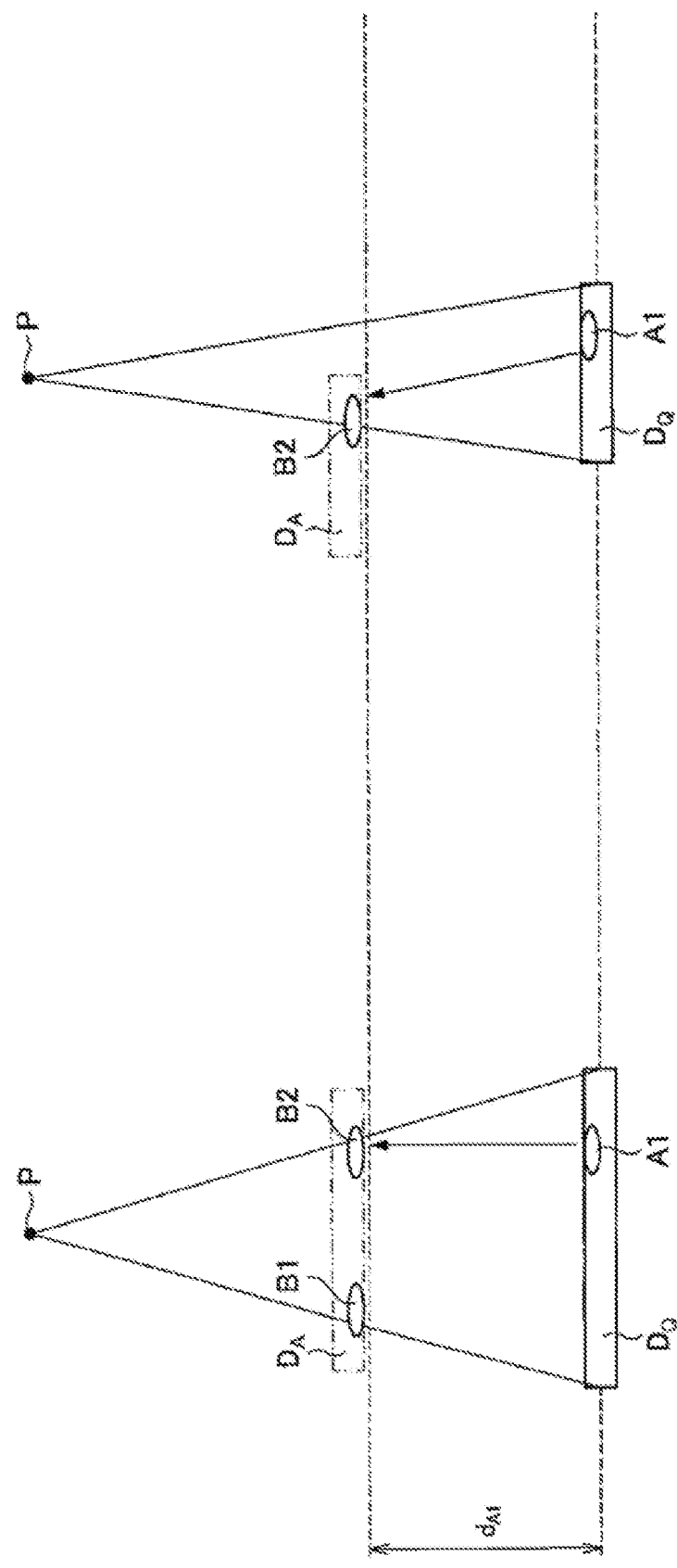

[FIG. 12]
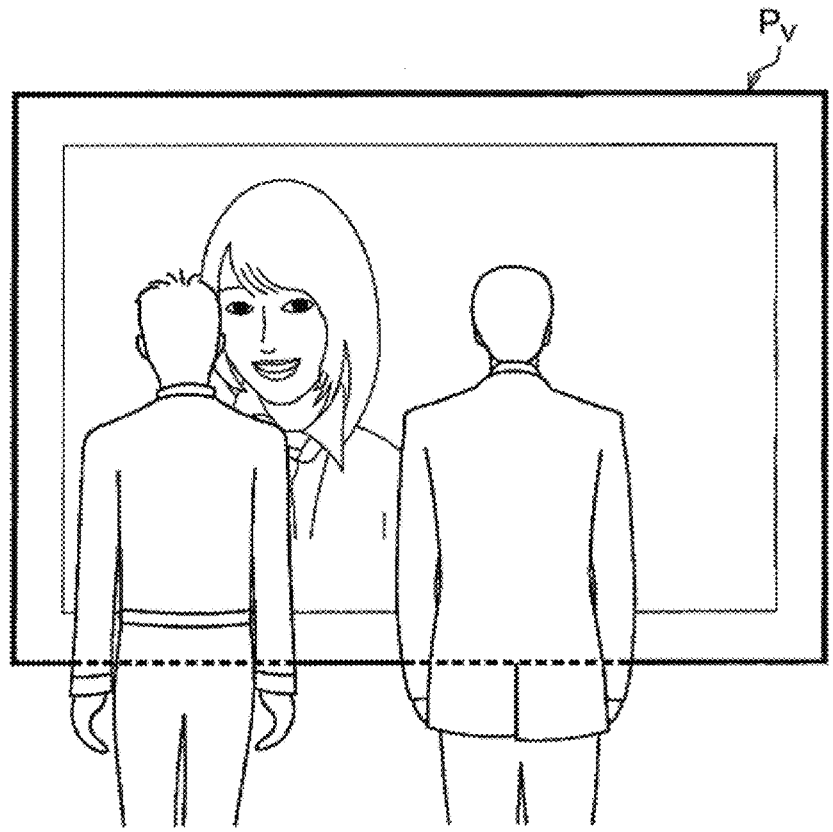
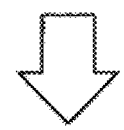
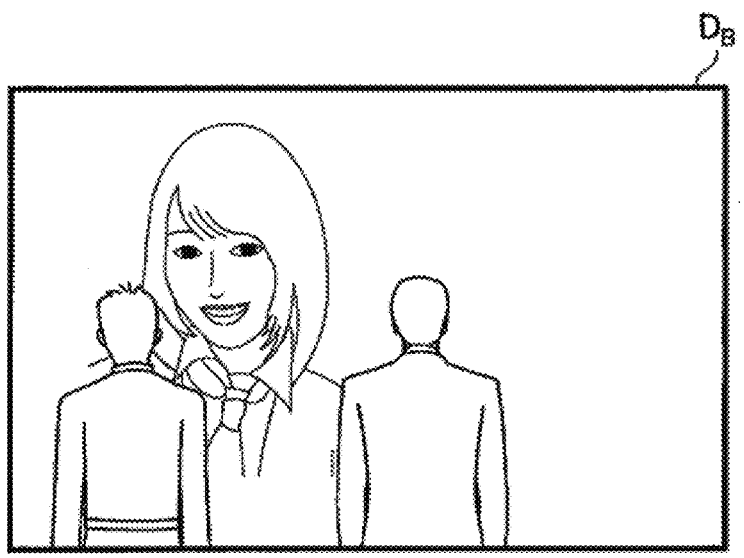

[FIG. 13]
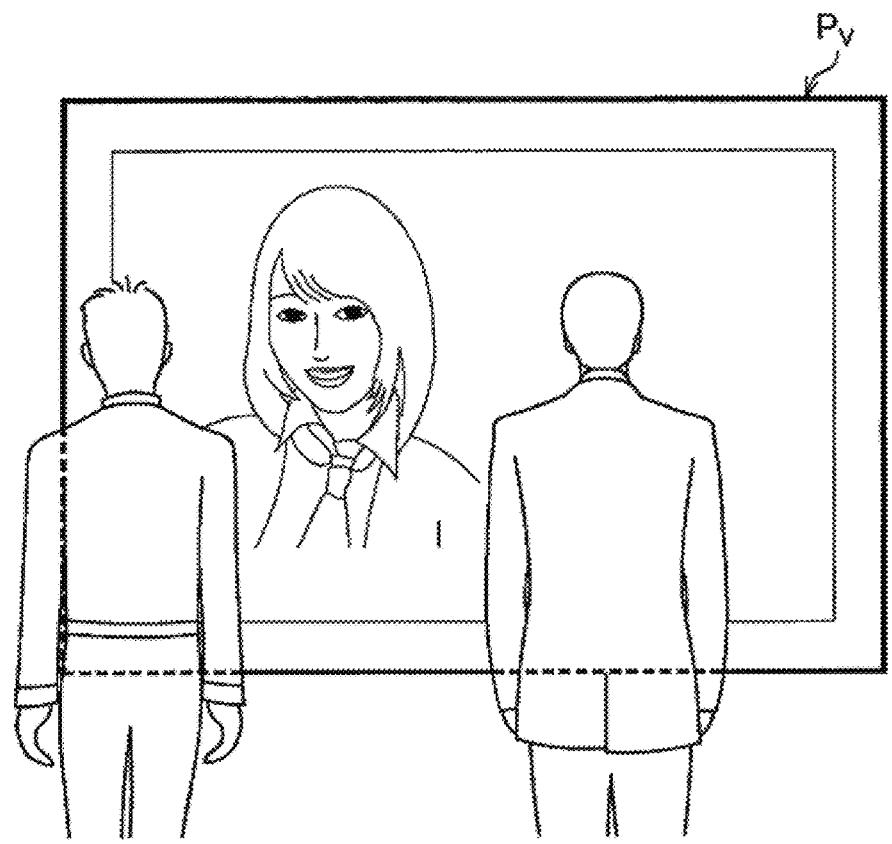
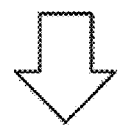
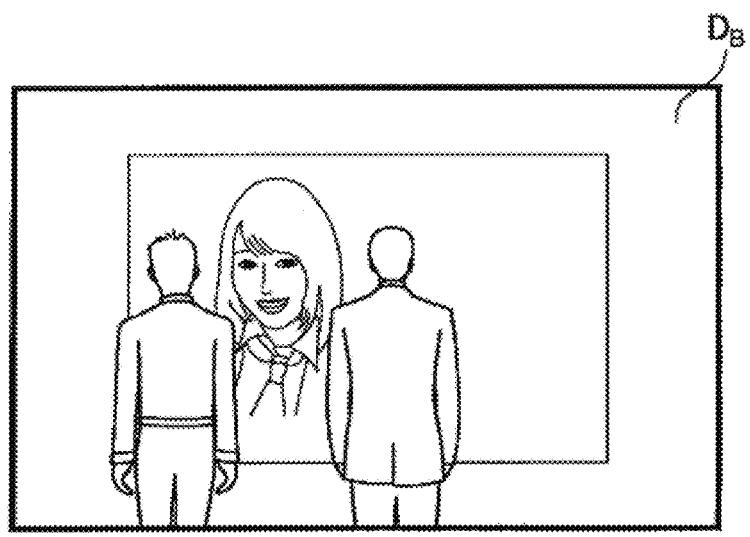

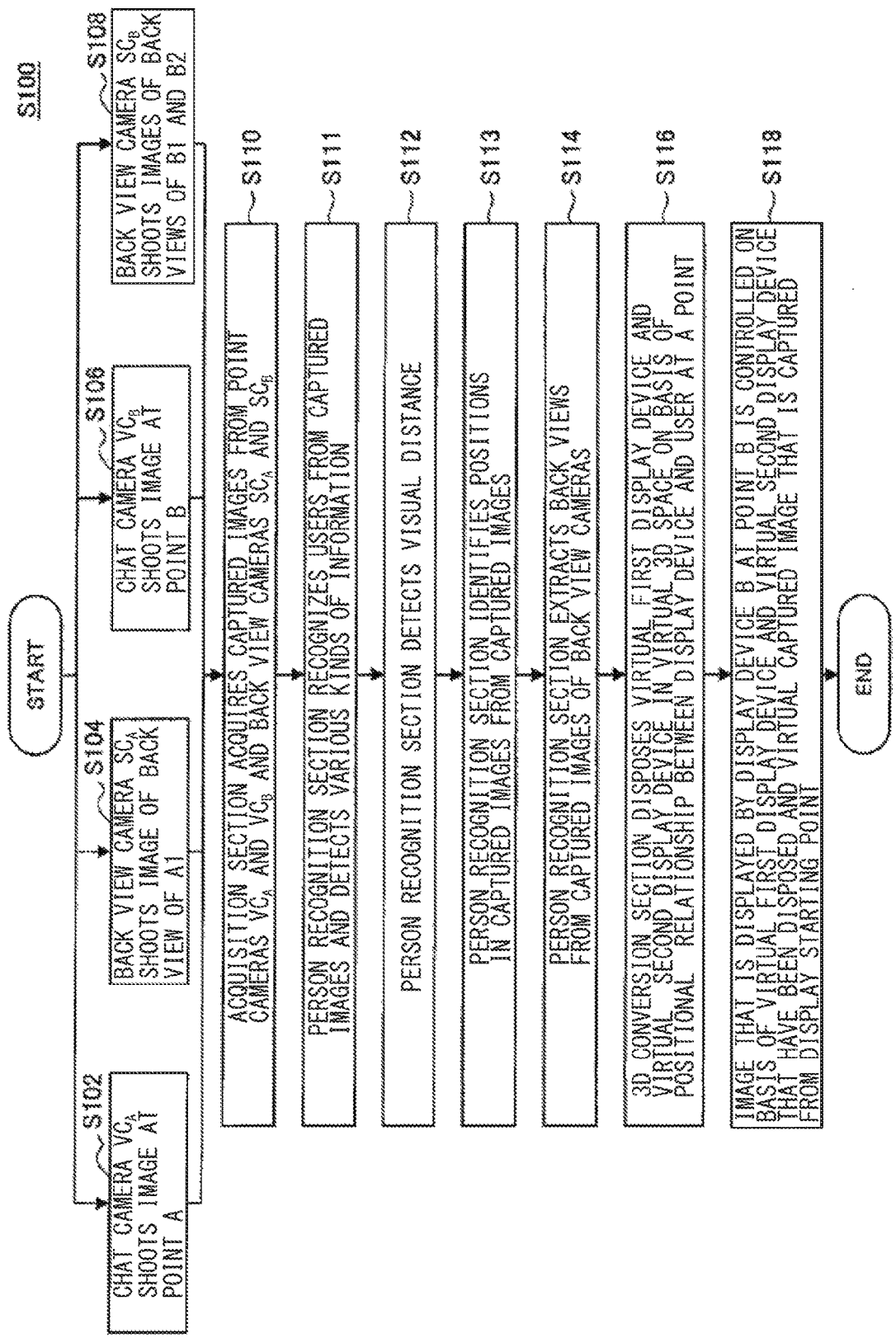
[FIG. 14]

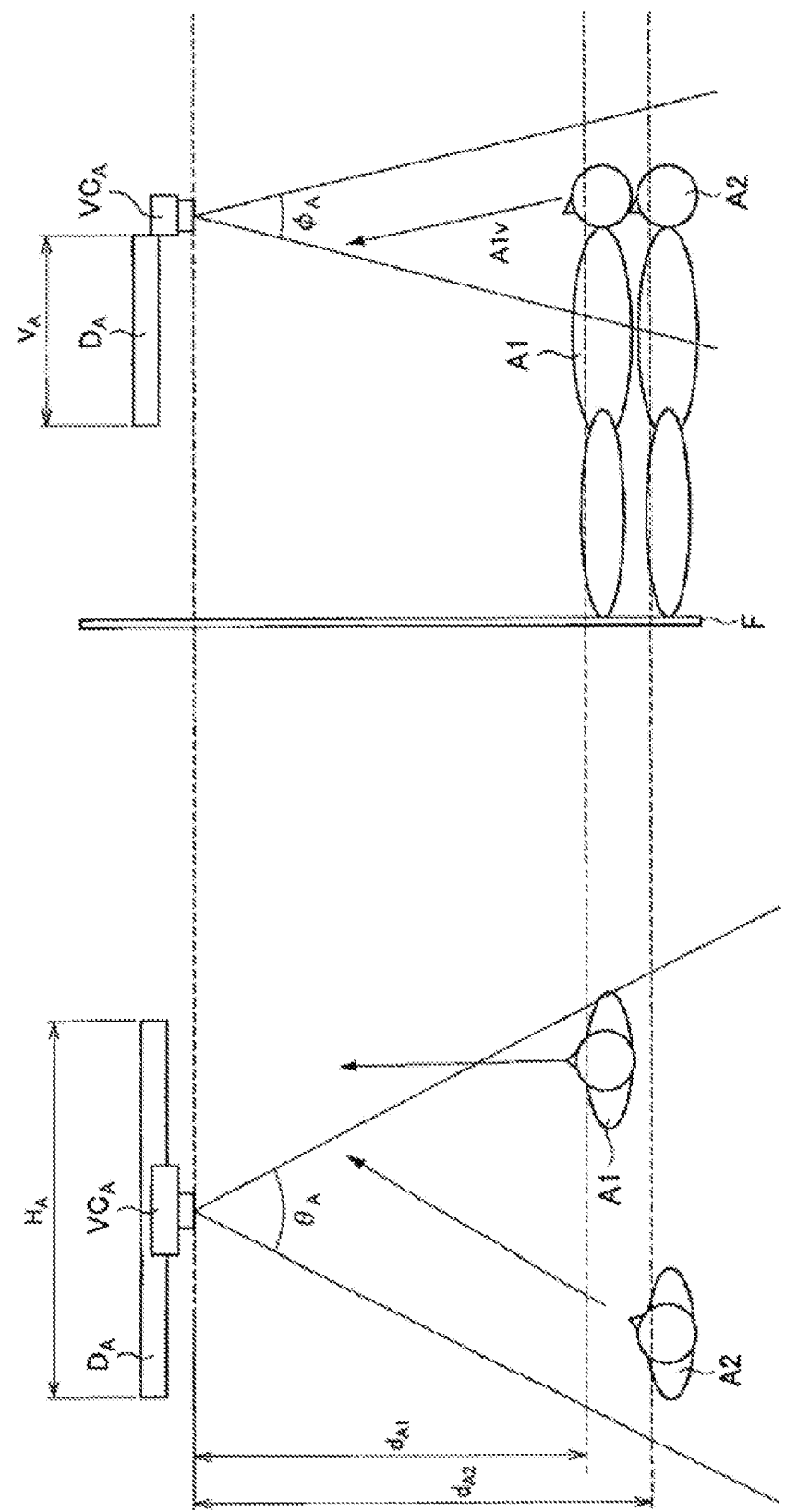
[FIG. 15]

[FIG. 16]
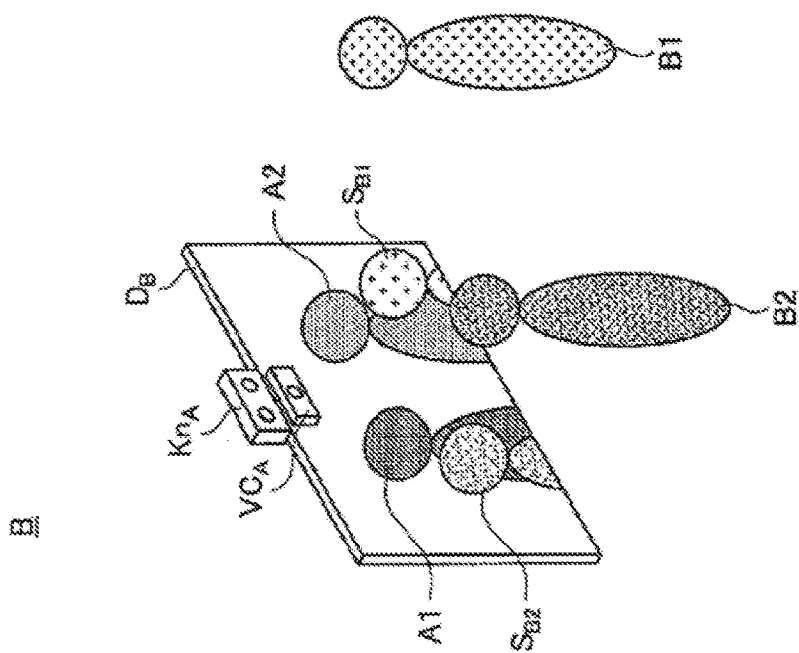
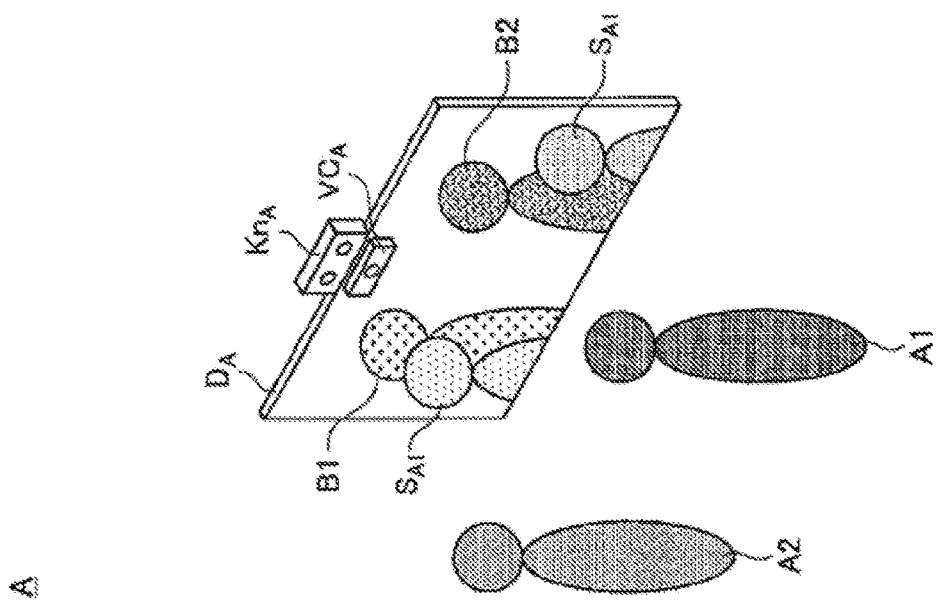

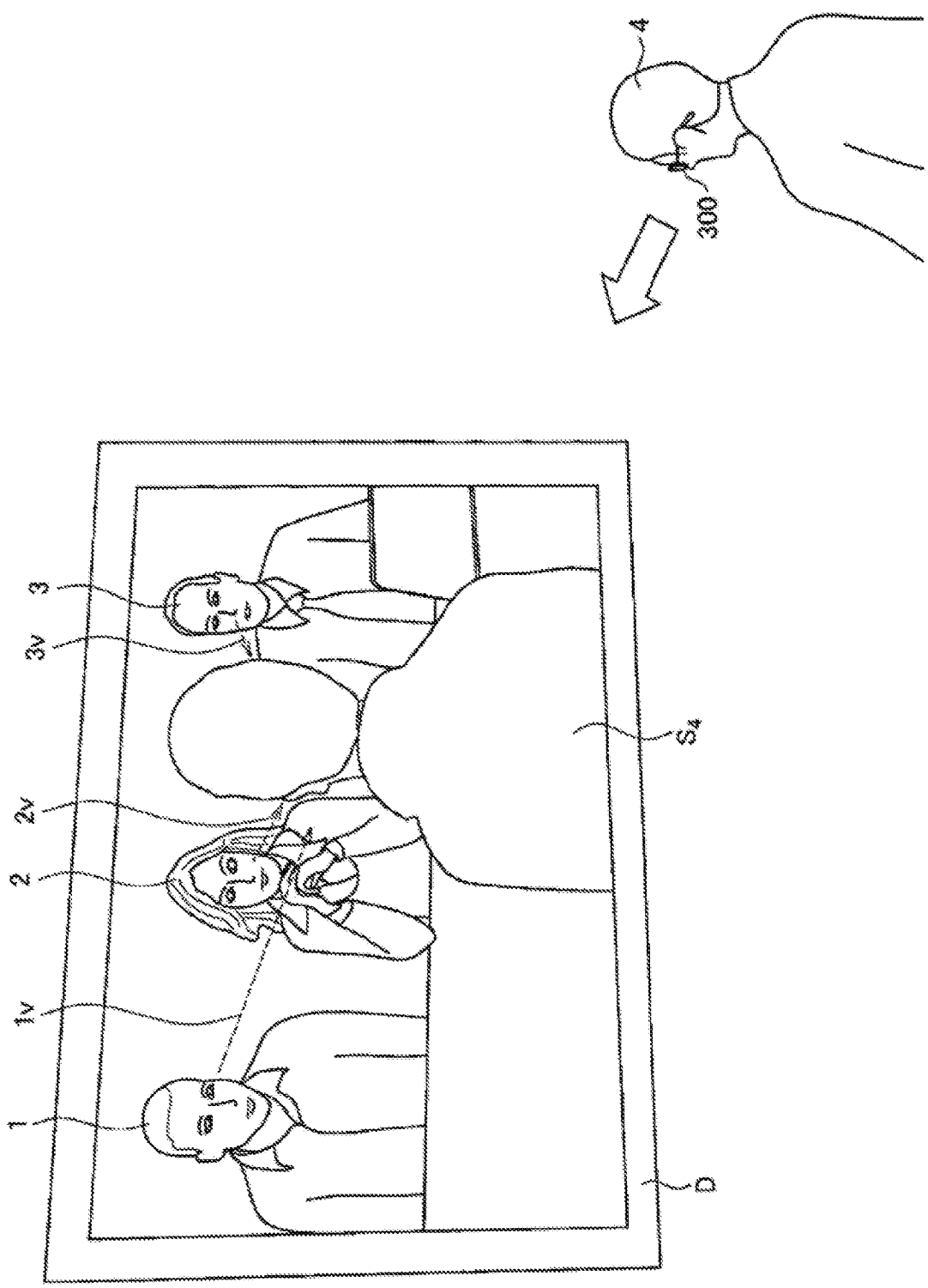
[FIG. 17]

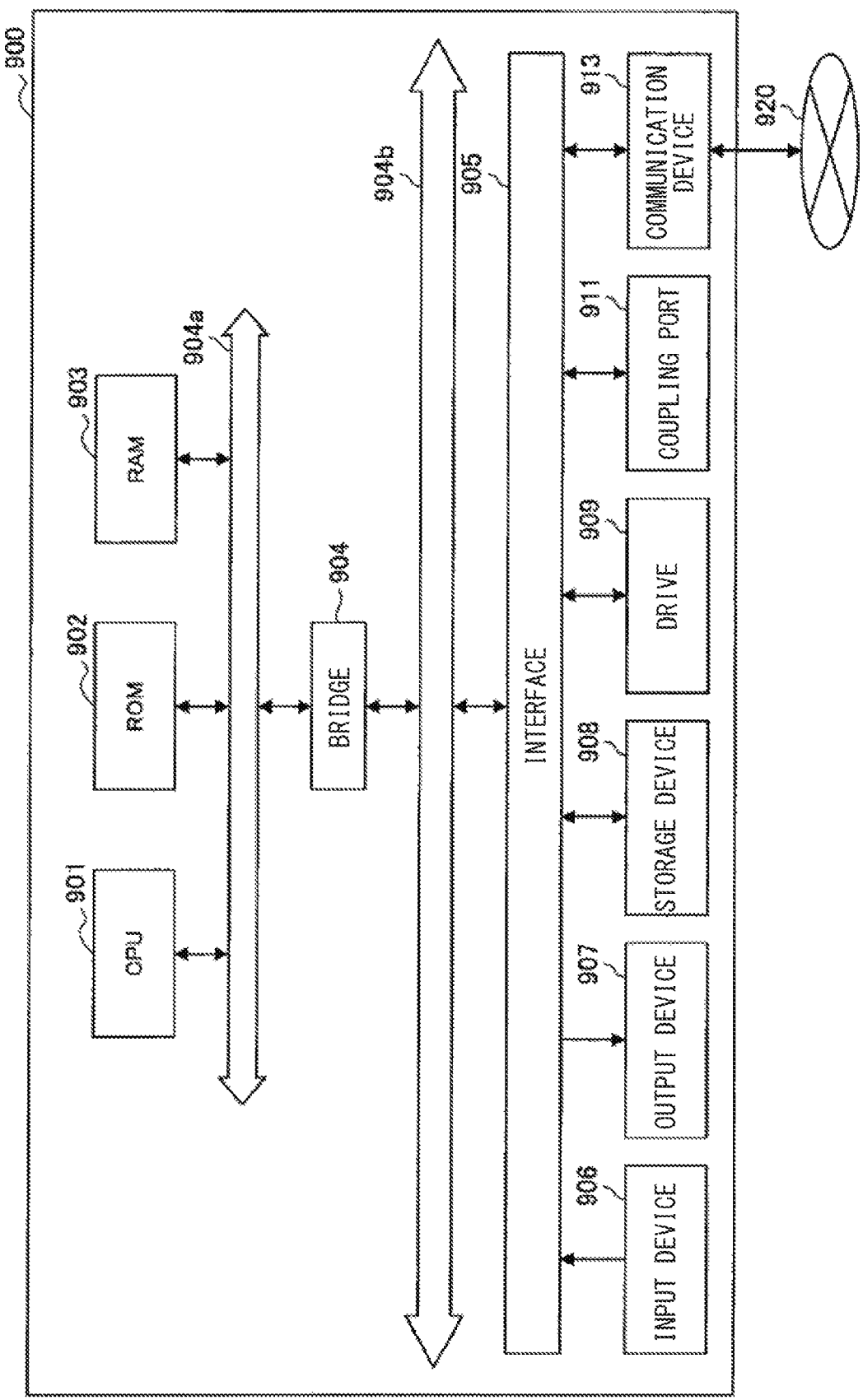
[FIG. 18]

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/040620 (filed on Oct. 16, 2019) under 35 U.S.C. § 371, which claims priority to Japanese Patent Application No. 2018-211671 (filed on Nov. 9, 2018), which are all hereby incorporated by reference in their entirety.

TECHNICAL FIELD

The present disclosure relates to an information processing apparatus, an information processing method, and a program.

BACKGROUND ART

In remote video communication in which a first user and a second user are present in different remote locations, the positional relationship between the first user displayed on a display device and a camera that images the first user may cause the first user displayed on the display device to have a line of sight shifted. This line of sight that is shifted sometimes causes failure in eye contact or the like. Accordingly, a variety of techniques have been developed to avoid such an occasion and allow the first user and the second user to experience realistic communication in eye contact with each other.

For example, PTL 1 discloses a technique used in a case where a plurality of users present in different locations performs communication. According to the technique in PTL 1, a user who has been called rotates an imaging device that images a user who has made a call and a display device in accordance with the gazing direction of the user who has been called, thereby achieving more realistic communication.

CITATION LIST

Patent Literature

PTL 1: Japanese Unexamined Patent Application Publication No. 2009-65490

SUMMARY OF THE INVENTION

Problems to be Solved by the Invention

The technique described in PTL 1 described above does not, however, make eye contact between the user who has been called and the user who has made a call. Depending on the position of the user who has made a call, it is difficult to achieve realistic communication.

In view of the circumstances described above, it is desired to develop a technique that achieves more realistic communication.

Means for Solving the Problems

According to the present disclosure, there is provided an information processing apparatus including a display control section that controls a second display device present in a second space. The second display device displays a first captured image obtained by imaging at least one or more first users present in a first space. The display control section superimposes and displays a second user object on the first captured image in accordance with line-of-sight relevant information of each of the first users. The second user object corresponds to each of at least one or more second users present in the second space.

In addition, according to the present disclosure, there is provided an information processing method including: controlling a second display device that is present in a second space and displays a first captured image obtained by imaging at least one or more first users present in a first space; and superimposing and displaying a second user object on the first captured image in accordance with line-of-sight relevant information of each of the first users. The second user object corresponds to each of at least one or more second users present in the second space.

In addition, according to the present disclosure, there is provided a program for causing a computer to function to include a display control section that controls a second display device present in a second space. The second display device displays a first captured image obtained by imaging at least one or more first users present in a first space. The display control section superimposes and displays a second user object on the first captured image in accordance with line-of-sight relevant information of each of the first users. The second user object corresponds to each of at least one or more second users present in the second space.

BRIEF DESCRIPTION OF DRAWING

FIG. 1 is a schematic diagram illustrating an overview of a technology of the present disclosure.

FIG. 2 is a schematic diagram illustrating the overview of the technology of the present disclosure.

FIG. 3 is a schematic diagram illustrating a conventional example for describing the overview of the technology of the present disclosure.

FIG. 4 is a schematic diagram illustrating the overview of the technology of the present disclosure.

FIG. 5 is a diagram illustrating an example of disposition of a variety of apparatuses of an information processing system according to an embodiment of the present disclosure.

FIG. 6 is a block diagram illustrating an internal configuration of the information processing system according to the embodiment.

FIG. 7 is a diagram illustrating an example of a process that is performed by a control unit of the information processing system according to the embodiment.

FIG. 8 is a diagram illustrating an example of a process that is performed by the control unit of the information processing system according to the embodiment.

FIG. 9 is a diagram illustrating an example of a process that is performed by the control unit of the information processing system according to the embodiment.

FIG. 10 is a diagram illustrating an example of a process that is performed by the control unit of the information processing system according to the embodiment.

FIG. 11 is a diagram illustrating an example of a process that is performed by the control unit of the information processing system according to the embodiment.

FIG. 12 is a diagram illustrating an example of a process that is performed by the control unit of the information processing system according to the embodiment.

FIG. 13 is a diagram illustrating an example of a process that is performed by the control unit of the information processing system according to the embodiment.

FIG. 14 is a diagram illustrating an example of a processing flow of the information processing system according to the embodiment.

FIG. 15 is a diagram illustrating an example of a modification example of the information processing system according to the embodiment.

FIG. 16 is a diagram illustrating an example of a modification example of the information processing system according to the embodiment.

FIG. 17 is a diagram illustrating an example of a modification example of the information processing system according to the embodiment.

FIG. 18 is a diagram illustrating an example of a configuration example of hardware of the information processing system according to the embodiment.

MODES FOR CARRYING OUT THE INVENTION

The following describes a preferred embodiment of the present disclosure in detail with reference to the accompanying drawings. It is to be noted that, in this description and the drawings, components that have substantially the same functional component are indicated by the same signs and redundant description thereof is thus omitted.

It is to be noted that description is given in the following order.
1. Regarding Technology of the Present Disclosure
1.1. Overview of Technology
1.2. Disposition of Back View
1.3. Effects
2. Configuration
2.1. External Configuration
2.2. Internal Configuration
3. Operation Flow
4. Modification Examples
4.1. Priority of Visual Distance
4.2. Use of Distance Measurement Sensor
4.3. Use of Eyewear Display Device
5. Hardware Configuration Example 1. Regarding Technology of the Present Disclosure (1.1. Overview of Technology)

With reference to FIG. 1, an overview of the technology of the present disclosure is described. The technology of the present disclosure relates to a technology used in a case where users present in different locations perform communication by using a video chat or the like.

In FIG. 1, a user 4 present in a first location performs communication with a user 1, a user 2, and a user 3 present in a second location via a display device D. In the display device D, a back view $S_4$ of the user 4 is disposed. The back view $S_4$ of the user 4 is disposed ahead of a line $1v$ of sight of the user 1, a line $2v$ of sight of the user 2, and a line $3v$ of sight of the user 3 displayed in the display device D. This makes the user 4 feel like the back view $S_4$ of the user 4 communicates with the user 1, the user 2, and the user 3 in eye contact with each other and allows for more realistic communication.

(1.2. Disposition of Back View)

With reference to FIG. 2, further description is given by using, as an example, communication between a user A1 and a user B1. The user A1 is present at an A point serving as the first location. The user B1 is present at a B point serving as the second location. The left portion of FIG. 2 schematically illustrates the disposition relationship between the user A1 and a display device $D_1$ and a camera $VC_1$ for a chat at the A point and the disposition relationship between the user B1 and a display device $D_2$ and a camera $VC_2$ for a chat at the B point.

The user A1 present at the A point visually recognizes the display device $D_1$ present at the A point and communicates with the user B1 at the B point. The camera $VC_1$ for a chat images A1 within the range of a field angle $VC\theta_1$. The camera $VC_1$ for a chat is provided to the display device $D_1$ present at the A point.

Similarly to the user A1 present at the A point, the user B1 present at the B point visually recognizes the display device $D_2$ present at the B point and communicates with the user A1 at the A point. The camera $VC_2$ for a chat images B1 within the range of a field angle $VC\theta_2$. The camera $VC_2$ for a chat is provided to the display device $D_2$ present at the B point.

The right portion of FIG. 2 illustrates captured images side by side. The captured images are captured by the camera $VC_1$ for a chat and the camera $VC_2$ for a chat. The camera $VC_1$ for a chat is provided to the display device $D_1$ present at the A point. The camera $VC_2$ for a chat is provided to the display device $D_2$ present at the B point.

In a captured image illustrated in the uppermost row, the user A1 visually recognizes the direction of a line $G1_{A1}$ of sight in the right end region of the display device $D_1$ from the user A1 to the display device $D_1$. The captured image illustrated in the uppermost row is obtained by imaging the user A1 present at the A point. A back view $S_{B1}$ of the user B1 present at the B point is superimposed and disposed ahead of the line $G1_{A1}$ of sight in the captured image in the uppermost row.

In a captured image illustrated in the middle row, the user A1 visually recognizes the direction of a line $G2_{A1}$ of sight in the middle end region of the display device $D_1$ from the user A1 to the display device $D_1$. The captured image illustrated in the middle row is obtained by imaging the user A1 present at the A point. The back view $S_{B1}$ of the user B1 present at the B point is superimposed and disposed ahead of the line $G2_{A1}$ of sight in the captured image in the middle row.

In a captured image illustrated in the lowest row, the user A1 visually recognizes the direction of a line $G3_{A1}$ of sight in the left end region of the display device $D_1$ from the user A1 to the display device $D_1$. The captured image illustrated in the lowest row is obtained by imaging the user A1 present at the A point. The back view $S_{B1}$ of the user B1 present at the B point is superimposed and disposed ahead of the line $G3_{A1}$ of sight in the captured image in the uppermost row.

The same applies to a captured image obtained by performing imaging at the B point. In a captured image illustrated in the uppermost row, the user B1 visually recognizes the direction of a line $G1_{B1}$ of sight in the right end region of the display device $D_2$ from the user B1 to the display device $D_2$. The captured image illustrated in the uppermost row is obtained by imaging the user B1 present at the B point. A back view $S_{A1}$ of the user A1 present at the A point is superimposed and disposed ahead of the line $G1_{B1}$ of sight in the captured image in the uppermost row.

In a captured image illustrated in the middle row, the user B1 visually recognizes the direction of a line $G2_{B1}$ of sight in the middle end region of the display device $D_2$ from the user B1 to the display device $D_2$. The captured image illustrated in the middle row is obtained by imaging the user B1 present at the B point. The back view $S_{A1}$ of the user A1 present at the A point is superimposed and disposed ahead of the line $G2_{B1}$ of sight in the captured image in the middle row.

In a captured image illustrated in the lowest row, the user B1 visually recognizes the direction of a line $G3_{B1}$ of sight in the left end region of the display device $D_2$ from the user B1 to the display device $D_2$. The captured image illustrated in the lowest row is obtained by imaging the user B1 present at the B point. The back view $S_{A1}$ of the user A1 present at the A point is superimposed and disposed ahead of the line $G3_{B1}$ of sight in the captured image in the lowest row.

In this way, a user displayed in a captured image at the A point has a back view of a user at the B point superimposed and displayed ahead of the line of sight in the captured image. This allows the user at the B point to simulate an experience in which the user at the B point communicated in eye contact with the user at the A point who is displayed in the captured image.

(1.3. Effects)

An object and effects of the technology of the present disclosure are specifically described with reference to FIGS. 3 and 4. FIG. 3 illustrates a case where a plurality of users performs communication in the same space without any display devices or the like. In a real meeting as in FIG. 3, a user 5, a user 6, a user 7, and a user 8 share the same space. The user 5 visually recognizes the user 7 who is a speaker and the user 6 visually recognizes the user 8 who is another speaker. The user 7 and the user 8 communicate with each other in eye contact. Each of the users is then able to grasp the respective users' lines of sight.

In contrast, FIG. 4 illustrates an example of a video chat for communication between different locations via a display device. The user 5, the user 6, and the user 8 have a meeting with the user 7 via a display device. The user 7 is present in a different location. The user 5 visually recognizes the user 7, the user 6 visually recognizes the user 8, and the user 8 visually recognizes the user 7. It is conceivable here that the user 7 is visually recognizing any of the user 5, the user 6, and the user 8 displayed in the display device visually recognized by the user 7. It is, however, difficult to grasp which of the user 5, the user 6, and the user 8 is visually recognized by the user 7 in communication via the display device. In other words, in such a video chat, the user 7 on a captured image frequently looks straight at a camera. The Mona Lisa effect sometimes causes the user 5, the user 6, and the user 8 to respectively recognize that the user 7 is visually recognizing the user 5, the user 6, and the user 8.

The application of the technology of the present disclosure makes it possible to superimpose and dispose a back view of any of the user 5, the user 6, and the user 8 to be visually recognized ahead of the line of sight of the user 7 on the captured image. This allows the user 5, the user 6, and the user 8 to determine which of the user 5, the user 6, and the user 8 is visually recognized by the user 7 and experience a more realistic meeting.

(2. Configuration)

(2.1. External Configuration)

With reference to FIGS. 5 and 6, an example of a configuration of an information processing system is described. The information processing system includes an information processing apparatus that allows a realistic meeting to be experienced. FIG. 5 is an overview diagram illustrating an overview of the information processing system and FIG. 6 is a block diagram illustrating an internal configuration of the information processing system.

According to FIG. 5, the user A1 is present at the point A and a display device $D_A$, a camera $VC_A$ for a chat, and a camera $SC_A$ for a back view are disposed at the point A. The user B1 and a user B2 are present at the point B and a display device $D_B$, a camera $VC_B$ for a chat, and a camera $SC_B$ for a back view are disposed at the point B.

At the point A, the display device $D_A$ displays a captured image that is captured by the camera $VC_B$ for a chat at the point B. The user A1 is able to visually recognize the user B1 and the user B2 for communication via the display device $D_A$. At the point B, the display device $D_B$ displays a captured image that is captured by the camera $VC_A$ for a chat at the point A. The user B1 and the user B2 are able to visually recognize the user A1 for communication via the display device $D_B$.

The display device $D_A$ superimposes and displays the back view $S_{A1}$ of the user A1 on the captured image that is captured by the camera $VC_B$ for a chat at the point B. The back view $S_{A1}$ is created from the captured image that is captured by the camera $SC_A$ for a back view. Meanwhile, the display device $D_B$ superimposes and displays the back view $S_{B1}$ of the user B1 and a back view $S_{B2}$ of the user B2 on the captured image that is captured by the camera $VC_A$ for a chat at the point A. The back view $S_{B1}$ and the back view $S_{B2}$ are created from the captured images that are captured by the camera $SC_B$ for a back view.

The user A1 is visually recognizing the user B2 displayed on the display device $D_A$ in the direction of a line A1$\nu$ of sight. The display device $D_B$ displays the back view $S_{B2}$ of the user B2 in the direction of the line A1$\nu$ of sight of the user A1. This allows B1 and B2 present at the point B to recognize that the user A1 is visually recognizing the user B2 for communication.

(2.2. Internal Configuration)

According to FIG. 6, an information processing system 1000 includes the back view camera $SC_A$, the chat camera $VC_A$, the display device $D_A$, the back view camera $SC_B$, the chat camera $VC_B$, the display device $D_B$, and a control unit 100. The back view camera $SC_A$, the chat camera $VC_A$, and the display device $D_A$ are provided at the point A. The back view camera $SC_B$, the chat camera $VC_B$, and the display device $D_B$ are provided at the point B.

The chat cameras $VC_A$ and $VC_B$ have functions of performing imaging at the respective points. Each of the chat cameras $VC_A$ and $VC_B$ is an imaging device such as an RGB camera or a thermography camera that captures an image (still image or moving image). Each of the chat cameras $VC_A$ and $VC_B$ may include a lens system, a driving system, and an imaging element. Captured images obtained by the chat cameras $SC_A$ and $SC_B$ may be used for image processing or may be used to be displayed on the display devices $D_A$ and $D_B$.

The back view cameras $SC_A$ and $SC_B$ have functions of imaging back views of users at the respective points. The back view cameras $SC_A$ and $SC_B$ may be imaging devices similar to the chat cameras $VC_A$ and $VC_B$.

The display devices $D_A$ and $D_B$ have functions of displaying captured images at the respective points and displaying back views of users in accordance with an instruction of the control unit 100. The captured images are captured by the chat cameras $VC_A$ and $VC_B$ in different locations. The back views are imaged by the back view cameras $SC_A$ and $SC_B$ present in the locations of the display devices $D_A$ and $D_B$. Specifically, each of the display devices $D_A$ and $D_B$ includes a device that is able to visually notify a user of a display image generated by the control unit 100. Example of such a device include display devices such as CRT (Cathode Ray Tube) display device, a liquid crystal display device, a plasma display device, and EL (electroluminescence) display device, a laser projector, an LED projector, and a lamp.

The control unit 100 has functions of acquiring various kinds of data from a variety of devices provided at the A point and the B point and controlling display devices. The control unit includes an acquisition section 110, a person recognition section 120, a 3D conversion section 130, and a display control section 140.

The acquisition section 110 acquires captured images from the back view cameras $SC_A$ and $SC_B$. In addition, the acquisition section 110 acquires captured images from the chat cameras $VC_A$ and $VC_B$. The acquisition section 110 acquires a captured image, for example, through communication. Communication may be constantly performed or may be discontinuously performed as appropriate. The acquisition section 110 outputs an acquired captured image to the person recognition section 120.

The person recognition section 120 has a function of identifying the positions of users by processing captured images acquired from the chat cameras $VC_A$ and $VC_B$. Description is made with reference to FIG. 7. FIG. 7 is a diagram illustrating that the person recognition section 120 recognizes the user A1 at the point A and acquires various kinds of information at the point A. At the point A illustrated in FIG. 7, the display device $D_A$ and the user A1 are opposed to each other. The left portion of FIG. 7 is a top view illustrating the display device $D_A$ and the user A1 from the right above and the right portion of FIG. 7 is a side view illustrating the display device $D_A$ and the user A1 from the side. The display device $D_A$ has a horizontal direction length $H_A$ and a vertical direction length $V_A$. As illustrated in FIG. 7, the upper portion of the display device $D_A$ is provided with the chat camera $VC_A$. The chat camera $VC_A$ has a horizontal imaging field angle $\theta_A$ in the horizontal direction and a vertical imaging field angle $\varphi_A$ in the vertical direction within any range from the chat camera $VC_A$.

The person recognition section 120 recognizes the position in a three-dimensional space at which the user A1 is present within the horizontal imaging field angle $\theta_A$ and the vertical direction imaging field angle $\varphi_A$ from a captured image that is captured by the chat camera $VC_A$. The person recognition section 120 may recognize the position of the user A1 with respect to the display device $D_A$.

Further, the person recognition section 120 has a function of acquiring line-of-sight relevant information of a user from a captured image that is captured by the chat camera $VC_A$. The line-of-sight relevant information of a user includes pieces of information regarding the user's line of sight and visual distance. A user's line of sight includes the line-of-sight direction and the line-of-sight position of the user with respect to the display device $D_A$. The visual distance of a user may be the horizontal distance from the eyes of the user to the display device $D_A$. In a case where description is given with reference to the left portion of FIG. 7, the user A1 casts the line A1v of sight to display device $D_A$ and the user A1 visually recognizes the display device $D_A$ within a visual distance $d_{A1}$. The visual distance $d_{A1}$ is the horizontal distance from the eyes of a user to the display device $D_A$. In a case where description is given with reference to the right portion of FIG. 7, the user A1 standing upright on a floor F casts the line A1v of sight to display device $D_A$ and the user A1 visually recognizes the display device $D_A$ within a visual distance $d_{A1}$. The visual distance $d_{A1}$ is the horizontal distance from the eyes of a user to the display device $D_A$. In this way, the person recognition section 120 recognizes the horizontal distance from the eyes of a user to the display device $D_A$ as the visual distance.

The person recognition section 120 has a function of detecting users from captured images that are captured by the chat cameras $VC_A$ and $VC_B$. In a case where description is given with reference to FIG. 8, at the point B, the person recognition section 120 detects persons such as the users B1 and B2 from the objects present in the space at the point B and identifies each of the users B1 and B2 by performing image processing on a captured image at the point B.

The person recognition section 120 has a function of detecting back views of users from captured images that are captured by the back view cameras $SC_A$ and $SC_B$ in a similar way to detect users from captured images that are captured by the chat cameras $VC_A$ and $VC_B$. The person recognition section 120 may recognize that the user A1 imaged by the chat camera $SC_A$ at the point A and the user A1 imaged by the back view camera $SC_A$ at the point A refer to the same user and associate the user A1 imaged by the chat camera $SC_A$ at the point A and the user A1 imaged by the back view camera $SC_A$ at the point A. Such association makes it possible to dispose a back view of the user A1 at the position of the user A1 imaged by the chat camera $VC_A$ at the point A in a virtual 3D space that is described below.

The 3D conversion section 130 has functions of generating a virtual captured image by using various kinds of information acquired from the person recognition section 120 and outputting the generated virtual captured image to the display control section 140. The virtual captured image is for controlling a display image that is displayed by a display device at the point B. In a case where description is given with reference to FIG. 9, the 3D conversion section 130 disposes the display device $D_A$ and the display device $D_Q$ in a virtual 3D space, thereby determining the display positions of the back view $S_{B1}$ of the user B1 and the back view $S_{B2}$ of the user B2 by using the visual distance $d_{A1}$ of the user A1. The back view $S_{B1}$ of the user B1 and the back view $S_{B2}$ of the user B2 are user objects.

With reference to FIGS. 10 and 11, a process performed by the 3D conversion section 130 is described in detail. FIG. 10 illustrates a virtual 3D space 200. In the virtual 3D space 200, the positional relationship is simulated between the display device $D_A$ and the user A1 at the A point. A virtual first display device $D_A$ is disposed in the virtual 3D space 200. The virtual first display device $D_A$ indicates the same size as that of the display device $D_A$ disposed at the A point in a real space. Here, the virtual first display device indicates the same size as that of the display device $D_A$ and is thus denoted with the same sign.

A virtual second display device $D_Q$ is disposed at the position opposed to the virtual first display device $D_A$. The disposition position of the virtual second display device $D_Q$ is determined on the basis of the positional relationship between the display device $D_A$ and the user A1 at the point A. Specifically, the virtual second display device $D_Q$ is disposed to be spaced apart from the virtual first display device $D_A$ with the same distance in between as the visual distance $d_{A1}$ between the display device $D_A$ and the user A1 at the point A.

The virtual first display device $D_A$ displays the users B1 and B2 imaged by the chat camera $VC_B$ as at the point A and the virtual second display device $D_Q$ displays the user A1 imaged by the chat camera $VC_A$ as at the point B as at the point A.

The vertical and horizontal size of the virtual second display device $D_Q$ in a virtual 3D space is determined on the basis of the visual distance and the field angle of the first imaging device that captures the first captured image. In other words, a horizontal size $H_Q$ of the virtual second display device $D_Q$ is determined on the basis of the visual distance $d_{A1}$ and the horizontal imaging field angle $\theta_A$ of the virtual first display device $D_A$. It is possible to express the horizontal size $H_Q$ of the virtual second display device $D_Q$ as $H_Q=2d_{A1}\tan(\theta_A/2)$. In contrast, a vertical size $V_Q$ of the virtual second display device $D_Q$ is determined on the basis of the visual distance $d_{A1}$ and the vertical imaging field angle $\varphi_A$ of the virtual first display device $D_A$. It is possible to express the vertical size $V_Q$ of the virtual second display device $D_Q$ as $V_Q=2d_{A1}\tan(\varphi_A/2)$.

The 3D conversion section 130 converts an image by using the disposition of the respective virtual display devices illustrated in FIG. 10 and the user A1, the user B1, and the user B2 displayed on the virtual display devices. The 3D conversion section 130 outputs information to the display control section 140. The information is for generating an image that is displayed on the display device $D_B$ at the point B.

The 3D conversion section 130 further disposes a display starting point in the virtual 3D space described above and generates an image by using a virtual captured image that is captured by a virtual imaging device (not illustrated) from the display starting point. The image is displayed on the display device $D_B$ at the point B. FIG. 11 is a diagram further illustrating a display starting point P in the disposition of a virtual first display device and a virtual second display device in FIG. 10. The display starting point P is at a position on the same side as that of the position at which a first display device is disposed by using the first user A1 displayed on the virtual second display device $D_Q$ as a starting point. The position of the display starting point P is farther than the position of the virtual first display device. An image that is displayed on the display device $D_B$ at the point B in areal space is controlled on the basis of the virtual first display device $D_A$, the virtual second display device $D_Q$, and a virtual captured image that is captured from the display starting point P. Specifically, a virtual captured image $P_V$ is an image that is captured from the display starting point P and is obtained by imaging an object within a field angle range visually recognized from the display starting point P. The virtual captured image $P_V$ is an image indicating that the virtual first display device and the virtual second display device are superimposed in a case where a person or the like visually recognizes the direction of the virtual first display device from the display starting point P.

The display control section 140 controls an image by using a virtual captured image generated by the 3D conversion section 130. The image is displayed on the display device $D_B$ at the point B in a real space.

With reference to FIGS. 12 and 13, a virtual captured image and display control are described. Each of FIGS. 12 and 13 is a diagram illustrating an example in which an image that is displayed on the display device DB is controlled on the basis of the virtual captured image Pv that is captured from the display starting point P. The upper portion of FIG. 12 illustrates the virtual captured image Pv. According to this, the user A1 who is displayed on the virtual second display device and the users B1 and B2 who are displayed on the virtual second display device Do are displayed in the virtual captured image Pv and the user A1 and a back view of the user B1 are superimposed and displayed.

In a case where a back view of the user B1 or B2 is displayed overlapping with the user A1 in the virtual captured image Pv as illustrated in the upper portion of FIG. 12, the display control section 140 changes the size of the back view of the user B1 or B2 and prevents the back view of the user B1 or B2 from overlapping with the user A1 as illustrated in the lower portion of FIG. 12. It may be determined as appropriate by a user who uses the information processing system 1000 to what degree the back view overlaps. For example, it is sufficient if the display control section 140 changes the size of the back view to prevent the back view from overlapping with at least an eye of the user A1. The display control section 140 may thus change the size of the back view of the user B1 or B2 to dispose the back view out of a certain distance from the position of a recognized eye of the user A1. In addition, for example, the display control section 140 may determine whether or not to change the size of the back view of the user B1 or B2 on the basis of whether or not the back view of the user B1 or B2 overlaps with the outline of the face of the user A1. If the back view of the user B1 or B2 overlaps with the outline of the face of the user A1, the display control section 140 may change the size of the back view of the user B1 or B2 to prevent the back view from overlapping with the outline of the face of the user A1. This allows the users B1 and B2 to certainly grasp the line of sight of the user A1 and allows for more comfortable communication.

In addition, in a case where a back view of the user B1 or B2 gets out of the frame in the virtual captured image Pv as illustrated in FIG. 13, the display control section 140 may change the range of the virtual captured image Pv to cause the virtual captured image Pv to include the user B1 or B2 who gets out of the frame. This change is made through the movement of the display starting point P. For example, the display starting point P and the virtual second display device Do may be disposed to be spaced apart more to cause the virtual captured image Pv to include the user B1 or B2 who gets out of the frame. This makes it possible to reduce the virtual first display device $D_A$ and the virtual second display device $D_Q$ in size in the virtual captured image Pv as illustrated in the lower portion of FIG. 13 and makes it possible to clearly display the user A1 and the users B1 and B2.

Such display control makes it possible to display a display image without causing any strangeness. In addition, it is also possible to achieve display control through a conversion process with reduced processing loads.

Further, in a case where the user B1 or B2 gets out of the frame in the virtual captured image Pv, the display control section 140 may also change the display position of a back view of the user B1 or B2 to cause the virtual captured image Pv to include the back view of the user B1 or B2 who gets out of the frame. The display position may be changed within a range within in which the line of sight of the user A1 and the position of the back view correspond to each other. It is to be noted that the display control section 140 changes a position at which a back view of a user is disposed in a captured image visually recognized by a user at the B point in the present embodiment, but this example is not limitative. The display control section 140 may determine in advance a position at which a back view of a user at the B point is disposed, process the line of sight of a user at the A point at the position at which the back view of the user at the B point is disposed, and process the lines of sight as if the line of sight of the user at the A point matched with the line of sight of the back view of the user at the B point. The respective back views of the users at the B point may be then provided with tags and processed to allow the respective users to be identified. The respective back views of the users at the B point are disposed ahead of the line of sight of the user at the A point who is visually recognized at the B point.

In addition, in a case where a back view of the user B1 or B2 is displayed overlapping with the user A1 in the virtual captured image Pv as illustrated in the upper portion of FIG. 12, the display control section 140 may retain the visual recognizability of the user A1 and the back view by changing the transmissivity of the back view. Specifically, the display control section 140 may further increase the transmissivity of a portion of the back view overlapping with the user A1 and may decrease the transmissivity of a portion of the back view that does not overlap with the user A1. This allows the display control section 140 to retain the visual recognizability of the user A1 and also retain the visual recognizability of the back view.

(3. Operation Flow)

The operation flow (S100) described so far and performed by the respective devices and the respective components is described with reference to FIG. 14.

First, at the point A, the chat camera $VC_A$ shoots an image at the point A (S102). In addition, at the point A, the back view camera $SC_A$ shoots an image of a back view of the user A1 (S104). In contrast, at the point B, the chat camera $VC_B$ shoots an image at the point B (S106). In addition, at the point B, the back view camera $SC_B$ shoots images of back views of the users B1 and B2 (S108).

These operations may concurrently start or sequentially start. The operations may be performed in any order.

Next, the acquisition section acquires captured images from the chat cameras $VC_A$ and $VC_B$ and the back view cameras $SC_A$ and $SC_B$ (S110).

Next, the person recognition section 120 recognizes users from the captured images and detects various kinds of information (S111).

The person recognition section 120 detects the visual distance of the user A1 (S112). The person recognition section 120 then detects and identifies the user A1 from the captured images and detects the visual distance between the chat camera $VC_A$ and the user A1.

The person recognition section 120 identifies the positions of the users in the captured images from the captured images (S113). The person recognition section 120 then detects and identifies the users B1 and B2 from the captured images and identifies the positions in the captured images. It is to be noted that the positions in the captured images may be positions in a real space at the point B.

The person recognition section 120 extracts back views from the captured images of the back view cameras (S114). The person recognition section 120 then detects and identifies the portions of the persons of the users B1 and B2 from the captured image. The person recognition section 120 separates the back views of the users B1 and B2 in the captured images from the background and extracts the back views of the users B1 and B2.

Next, the 3D conversion section disposes the virtual first display device and the virtual second display device in a virtual 3D space on the basis of the positional relationship between a display device and the user A1 at the A point (S116).

Next, the display control section controls an image that is displayed by a display device B at the point B on the basis of the positional relationship between the virtual first display device and the virtual second display device that have been disposed and a virtual captured image that is captured from the display starting point (S120).

The respective components perform the operation flow described above, thereby making it possible to display a display image with no strangeness caused without correcting the face of the user A1, performing image processing on the face of the user A1, or the like. In addition, it is also possible to achieve display control through a 3D conversion process with reduced processing loads.

4. Modification Examples

The information processing apparatus and the information processing method according to the present embodiment have been described so far. In this section, with reference to FIGS. 15 and 16, an example of a modification example of the information processing apparatus and the information processing method according to the present embodiment is described.

(4.1. Priority of Visual Distance)

In the embodiment described above, the example has been described in which the user A1 is present at the point A, the users B1 and B2 are present at the point B. and communication is performed between the point A and the point B. Here, with reference to FIG. 15, as a modification example of the embodiment described above, an example of a case is described where a plurality of users is at the point A. FIG. 15 is a diagram illustrating an example of a case where a plurality of users is at the point A.

The point A illustrated in FIG. 15 has the user A1 and a user A2. The user A1 and the user A2 stand upright on the floor F and visually recognize the display device $D_A$. The user A1 and the user A2 have different distances to the display device $D_A$. The distances between the user A1 and the user A2 and the display device $D_A$ may be the visual distances of the user A1 and the user A2 to the display device $D_A$. The visual distance may be the horizontal distance from the eyes of a user to the display device $D_A$.

In this way, in a case where a plurality of users is present at the point A, the control unit 100 may preferentially perform display control on the visual distance of the user having the smallest visual distance. The direction of a line of sight varies in a wider range as a chat camera is closer. It is therefore possible to suppress the variation range by prioritizing the visual distance of the user having the smallest visual distance as described. In addition, the control unit 100 may identify a speaker from a plurality of users at the point A and preferentially perform display control on the visual distance of the identified speaker.

(4.2. Use of Distance Measurement Sensor)

As an example of another modification example of the embodiment described above, a technology is described with reference to FIG. 16 in which a distance measurement sensor is used in place of a back view camera that acquires information for creating a back view.

FIG. 16 illustrates an example in which the display device $D_A$ and the display device $D_B$ includes distance measurement sensor devices $Kn_A$ and $Kn_B$. The display device $D_A$ and the display device $D_B$ are illustrated in FIG. 5. The distance measurement sensor devices are disposed at positions at which it is possible to measure the distances from the distance measurement sensor devices to a part of the body of a user. Examples of the distance measurement sensor devices include a ToF (Time of Flight) sensor. For example, a ToF sensor measures the distance to the body of a user by using a method (dToF method) in which the body of a user is irradiated with pulsing infrared light and the time is directly measured that elapses before the infrared light reflected on the body surface comes back, a method (iToF method) in which infrared light is modulated and calculation is performed on the basis of the phase difference between the phase of irradiation light and the phase of light that is reflected and comes back, or the like.

The control unit 100 may acquire information regarding a motion of a user by using the distance measurement sensor devices $Kn_A$ and $Kn_B$ and create an avatar or a user object obtained by partially processing the avatar on the basis of the information. In a case where there is a plurality of users, the control unit 100 may associate users identified by the chat cameras $VC_A$ and $VC_B$ and users for whom pieces of information regarding motions of users are acquired by the distance measurement sensor devices $Kn_A$ and $Kn_B$. The control unit 100 may acquires motions or the like of the skeletal structures of the users in real time and reflect the motions or the like in user objects. In a case where there is a plurality of users, the display control section 140 may reflect the visual characteristics of the respective users in user objects. The user objects correspond to the respective users. This causes the respective user objects to have differences and makes it possible to identify the user objects. The visual characteristics may be, for example, the texture of clothing, hairstyles, or the like.

It is to be noted that the example has been described in the present modification example in which a distance measurement sensor device is used in place of a back view camera A chat camera and a distance measurement sensor device may be, however, the same device. According to this, it is possible to measure a distance by performing image recognition and image processing on a captured image that is captured by a chat camera and suppress the number of installed devices.

(4.3. Use of Eyewear Display Device)

As an example of another modification example of the embodiment described above, a technology is described with reference to FIG. 17 in which a user wears an eyewear display device for visual recognition in a case where display control is performed on a user object. FIG. 17 illustrates an example in which the example of the overview of the technology of the present disclosure illustrated in FIG. 1 is applied to an eyewear display device. According to FIG. 17, the user 4 wears transmissive glasses 300. The user 4 visually recognizes a user object $S_4$ superimposed and displayed by the transmissive glasses 300 on a captured image displayed on a display device D. This makes it possible to change the display position of the user object $S_4$ in accordance with the position of a user even in a case where the user moves, further enhancing the convenience.

5. Hardware Configuration Example

With reference to FIG. 18, an example of a hardware configuration of the control unit of the information processing apparatus included in the information processing system according to the present embodiment is described. FIG. 18 is a block diagram illustrating an example of the hardware configuration of the control unit according to the present embodiment.

As illustrated in FIG. 18, an information processing apparatus 900 includes CPU (Central Processing Unit) 901, ROM (Read Only Memory) 902, RAM (Random Access Memory) 903, and a host bus 904a. In addition, the information processing apparatus 900 includes a bridge 904, an external bus 904b, an interface 905, an input device 906, a display device 907, a storage device 908, a drive 909, a coupling port 911, and a communication device 913. The information processing apparatus 900 may include a processing circuit such as an electrical circuit, DSP, or ASIC in place of the CPU 901 or along with the CPU 901.

The CPU 901 functions as an arithmetic processing device and a control device. The CPU 901 controls the overall operation in the information processing apparatus 900 in accordance with a variety of programs. In addition, the CPU 901 may be a microprocessor. The ROM 902 stores a program, an arithmetic parameter, and the like to be used by the CPU 901. The RAM 903 temporarily stores a program used in execution of the CPU 901, a parameter appropriately changed in the execution, and the like. The CPU 901 may form the control unit illustrated in FIG. 6, for example.

The CPU 901, the ROM 902, and the RAM 903 are coupled to each other by the host bus 904a including a CPU bus and the like. The host bus 904a is coupled to the external bus 904b such as a PCI (Peripheral Component Interconnect/Interface) bus via the bridge 904. It is to be noted that the host bus 904a, the bridge 904, and the external bus 904b do not necessarily have to be separately included, but the functions thereof may be implemented in one bus.

The input device 906 is achieved by a device through which a user inputs information, such as a mouse, a keyboard, a touch panel, a button, a microphone, a switch, and a lever, for example. In addition, the input device 906 may be, for example, a remote control device using infrared rays or other electric waves. Alternatively, the input device 906 may be an external coupling device such as a mobile phone or PDA supporting an operation of the information processing apparatus 900. Further, the input device 906 may include, for example, an input control circuit or the like that generates an input signal on the basis of information inputted by the user using the input means described above and outputs the generated input signal to the CPU 901. The user of the information processing apparatus 900 is able to input various kinds of data to the information processing apparatus 900 or instruct the information processing apparatus 900 to perform a processing operation by operating this input device 906.

The display device 907 is formed by using a device that is able to visually or aurally notify the user of acquired information. Examples of such a device include display devices such as a CRT display device, a liquid crystal display device, a plasma display device, an EL display device, a laser projector, an LED projector, and a lamp, and sound output devices such as a speaker or a headphone. The display device 907 outputs, for example, results obtained through a variety of processes performed by the information processing apparatus 900. Specifically, the display device 907 visually displays the results obtained through a variety of processes performed by the information processing apparatus 900 in a variety of formats such as text, images, tables, and graphs. Meanwhile, in a case where the sound output device is used, the sound output device converts audio signals including reproduced sound data, acoustic data, or the like into analog signals and aurally outputs the analog signals. The display device 907 is, for example, the display device $D_A$ or the display device $D_B$ illustrated in FIG. 6.

The storage device 908 is a device for data storage that is formed as an example of a storage unit of the information processing apparatus 900. For example, the storage device 908 is achieved by a magnetic storage unit device such as HDD, a semiconductor storage device, an optical storage device, a magneto-optical storage device, or the like. The storage device 908 may include a storage medium, a recording device that records data in the storage medium, a reading device that reads data from the storage medium, a deletion device that deletes data recorded in the storage medium, and the like. This storage device 908 stores a program to be executed by the CPU 901, various kinds of data, various kinds of data acquired from the outside, and the like. The storage device 908 stores, for example, a virtual captured image, a variety of parameters, or the like. The virtual captured image is used in a case where the display control section 140 controls the display device $D_A$ and the display device $D_B$ in the control unit 100 illustrated in FIG. 6. The variety of parameters are used to generate the virtual captured image.

The drive 909 is a reader/writer for a storage medium. The drive 909 is built in or externally attached to the information processing apparatus 900. The drive 909 reads out information recorded in a removable storage medium such as a magnetic disk, an optical disc, a magneto-optical disk, or a semiconductor memory that is mounted thereon and outputs the information to the RAM 903. In addition, the drive 909 is also able to write information into the removable storage medium.

The coupling port 911 is an interface coupled to an external apparatus. The coupling port 911 is a coupling port to an external apparatus that is able to transmit data through USB (Universal Serial Bus) and the like, for example.

The communication device 913 is a communication interface including, for example, a communication device and the like for coupling to a network 920. The communication device 913 is, for example, a communication card or the like for wired or wireless LAN (Local Area Network). LTE (Long Term Evolution), Bluetooth (registered trademark), or WUSB (Wireless USB). In addition, the communication device 913 may be a router for optical communication, a router for ADSL (Asymmetric Digital Subscriber Line), a modem for various kinds of communication, or the like. For example, this communication device 913 is able to transmit and receive signals and the like to and from the Internet and another communication apparatus in accordance with a predetermined protocol such as TCP/IP, for example. The communication device 913 is used for the transmission and reception of various kinds of information, for example, between the control unit 100 illustrated in FIG. 6 and a variety of devices at the A point and the B point. A device such as the communication device 913 may be used for this transmission and reception.

It is to be noted that the network 920 is a wired or wireless transmission path for information transmitted from an apparatus coupled to the network 920. For example, the network 920 may include a public network such as the Internet, a telephone network, or a satellite communication network, and various LANs (Local Area Networks) including Ethernet (registered trademark), WAN (Wide Area Network), and the like. In addition, the network 920 may include a private network such as IP-VPN (Internet Protocol-Virtual Private Network).

In addition, in the information processing apparatus 900, it is possible to create a computer program for causing the hardware such as CPU. ROM, and RAM built in the information processing system 1000 to exhibit functions equivalent to those of the respective components of the information processing system 1000 according to the present embodiment described above. In addition, a recording medium having the computer program stored thereon may also be included in the scope of the technology according to the present disclosure.

The preferred embodiment of the present disclosure has/have been described above in detail with reference to the accompanying drawings, but the technical scope of the present disclosure is not limited to the embodiment. A person skilled in the art may find various alterations and modifications within the scope of the appended claims, and it should be understood that they will naturally come under the technical scope of the present disclosure.

In addition, the effects described herein are merely illustrative and exemplary, but not limitative. In other words, the technology according to the present disclosure may exert other effects that are apparent to those skilled in the art from the description herein in addition to the above-described effects or in place of the above-described effects.

It is to be noted that the following configurations also fall within the technical scope of the present disclosure.

(1)

An information processing apparatus including a display control section that controls a second display device present in a second space, the second display device displaying a first captured image obtained by imaging at least one or more first users present in a first space, in which the display control section superimposes and displays a second user object on the first captured image in accordance with line-of-sight relevant information of each of the first users, the second user object corresponding to each of at least one or more second users present in the second space.

(2)

The information processing apparatus according to (1), in which the line-of-sight relevant information includes information regarding a visual distance from the first user present in the first space to a first display device visually recognized by the first user, and the display control section controls a display position of the second user object on the basis of the information regarding the visual distance, the second user object corresponding to the second user.

(3)

The information processing apparatus according to (2), in which the display control section controls a size of the first captured image on the basis of the information regarding the visual distance.

(4)

The information processing apparatus according to (3), further including a 3D conversion section that generates a virtual 3D space obtained by virtually expressing, in a same space, a positional relationship between the first user, the first display device, the second display device, and the second user, in which the display control section controls the display position of the second user object and the size of the first captured image on the basis of a positional relationship between the first user disposed in the virtual 3D space and the first display device disposed in the virtual 3D space and a virtual captured image, the first display device being disposed to be spaced apart by the visual distance from the first user, the virtual captured image being virtually captured from a display starting point disposed at a position on a same side as a side of the first display device in a case where the first user is used as a starting point, the position being farther than a position of the first display device.

(5)

The information processing apparatus according to (4), in which the second display device present in the second space is disposed at a same position as a position of the first user in association with the first user in the virtual 3D space, and the display control section controls the display position of the second user object and the size of the first captured image by using a positional relationship between the second display device and the first display device in the virtual 3D space.

(6)

The information processing apparatus according to any one of (2) to (5), in which a size of the first captured image is determined on the basis of the visual distance and a field angle of a first imaging device, the first captured image being displayed on the second display device, the first imaging device capturing the first captured image.

(7)

The information processing apparatus according to any one of (1) to (6), in which the display control section changes a size of the second user object to prevent the first user and the second user object from being superimposed, the first user being displayed in the first captured image.

(8)

The information processing apparatus according to any one of (2) to (7), in which the second user object corresponding to the second user is generated on the basis of an image of the second user, the image being extracted from a second user back view captured image obtained by imaging a back view of the second user.

(9)

The information processing apparatus according to (6), in which the information processing apparatus includes the first imaging device and the first display device that are integrated with each other.

(10)

The information processing apparatus according to any one of (2) to (9), in which the second user object is created by using information acquired from infrared light, the second user being irradiated with the infrared light, the infrared light being reflected from the second user.

(11)

The information processing apparatus according to any one of (1) to (10), in which the display control section further controls a first display device present in a first space and superimposes and displays a first user object on a second captured image in accordance with line-of-sight relevant information of each of at least one or more second users present in the second space, the first display device displaying the second captured image obtained by imaging the second user, the first user object corresponding to each of the at least one or more first users present in the first space.

(12)

An information processing method including:
    controlling a second display device present in a second space, the second display device displaying a first captured image obtained by imaging at least one or more first users present in a first space; and
    superimposing and displaying a second user object on the first captured image in accordance with line-of-sight relevant information of each of the first users, the second user object corresponding to each of at least one or more second users present in the second space.

(13)

A program for causing a computer to function to include
    a display control section that controls a second display device present in a second space, the second display device displaying a first captured image obtained by imaging at least one or more first users present in a first space, in which
        the display control section superimposes and displays a second user object on the first captured image in accordance with line-of-sight relevant information of each of the first users, the second user object corresponding to each of at least one or more second users present in the second space.

REFERENCE SIGNS LIST $D_A$, $D_B$ display device
$VC_A$, $VC_B$ camera for a chat
$SC_A$, $SC_B$ camera for a back view
100 control unit
110 acquisition section
120 person recognition section
130 conversion section
140 display control section

The invention claimed is:

1. An information processing apparatus comprising
    a display control section configured to
        control a second display device present in a second space, the second display device displaying a first captured image obtained by imaging at least one or more first users present in a first space, and
        superimpose and display a second user object on the first captured image in accordance with line-of-sight relevant information of each of the first users, the second user object corresponding to each of at least one or more second users present in the second space, wherein
    the line-of-sight relevant information includes information regarding a direction from the first user present in the first space to a first display device visually recognized by the first user,
    the second user object is superimposed and disposed ahead of the line of sight in the direction from the first user to the first display device visually recognized by the first user, and
    the display control section is implemented via at least one processor.

2. The information processing apparatus according to claim 1, wherein
    the line-of-sight relevant information includes information regarding a visual distance from the first user present in the first space to the first display device visually recognized by the first user, and
    the display control section is further configured to control a display position of the second user object on a basis of the information regarding the visual distance, the second user object corresponding to the second user.

3. The information processing apparatus according to claim 2, wherein the display control section is further configured to control a size of the first captured image on the basis of the information regarding the visual distance.

4. The information processing apparatus according to claim 3, further comprising a 3D conversion section configured to generate a virtual 3D space obtained by virtually expressing, in a same space, a positional relationship between the first user, the first display device, the second display device, and the second user, wherein
    the display control section is further configured to control the display position of the second user object and the size of the first captured image on a basis of a positional relationship between the first user disposed in the virtual 3D space and the first display device disposed in the virtual 3D space and a virtual captured image, the first display device being disposed to be spaced apart by the visual distance from the first user, the virtual captured image being virtually captured from a display starting point disposed at a position on a same side as a side of the first display device in a case where the first user is used as a starting point, the position being farther than a position of the first display device, and the 3D conversion section is implemented via at least one processor.

5. The information processing apparatus according to claim 4, wherein
the second display device present in the second space is disposed at a same position as a position of the first user in association with the first user in the virtual 3D space, and
the display control section is further configured to control the display position of the second user object and the size of the first captured image by using a positional relationship between the second display device and the first display device in the virtual 3D space.

6. The information processing apparatus according to claim 5, wherein a size of the first captured image is determined on a basis of the visual distance and a field angle of a first imaging device, the first captured image being displayed on the second display device, the first imaging device capturing the first captured image.

7. The information processing apparatus according to claim 1, wherein the display control section is further configured to change a size of the second user object to prevent the first user and the second user object from being superimposed, the first user being displayed in the first captured image.

8. The information processing apparatus according to claim 2, wherein the second user object corresponding to the second user is generated on a basis of an image of the second user, the image being extracted from a second user back view captured image obtained by imaging a back view of the second user.

9. The information processing apparatus according to claim 6, wherein the information processing apparatus includes the first imaging device and the first display device that are integrated with each other.

10. The information processing apparatus according to claim 2, wherein the second user object is created by using information acquired from infrared light, the second user being irradiated with the infrared light, the infrared light being reflected from the second user.

11. The information processing apparatus according to claim 1, wherein the display control section is further configured to control the first display device present in the first space and superimpose and display a first user object on a second captured image in accordance with line-of-sight relevant information of each of at least one or more second users present in the second space, the first display device displaying the second captured image obtained by imaging the second user, the first user object corresponding to each of the at least one or more first users present in the first space.

12. An information processing method comprising:
controlling a second display device present in a second space, the second display device displaying a first captured image obtained by imaging at least one or more first users present in a first space; and
superimposing and displaying a second user object on the first captured image in accordance with line-of-sight relevant information of each of the first users, the second user object corresponding to each of at least one or more second users present in the second space, wherein
the line-of-sight relevant information includes information regarding a direction from the first user present in the first space to a first display device visually recognized by the first user, and
the second user object is superimposed and disposed ahead of the line of sight in the direction from the first user to the first display device visually recognized by the first user.

13. A non-transitory computer-readable medium having embodied thereon a program, which when executed by a computer causes the computer to execute an information processing method, the method comprising:
controlling a second display device present in a second space, the second display device displaying a first captured image obtained by imaging at least one or more first users present in a first space; and
superimposing and displaying a second user object on the first captured image in accordance with line-of-sight relevant information of each of the first users, the second user object corresponding to each of at least one or more second users present in the second space, wherein
the line-of-sight relevant information includes information regarding a direction from the first user present in the first space to a first display device visually recognized by the first user, and
the second user object is superimposed and disposed ahead of the line of sight in the direction from the first user to the first display device visually recognized by the first user.

* * * * *